US011863643B1

(12) United States Patent
Seyeditabari et al.

(10) Patent No.: US 11,863,643 B1
(45) Date of Patent: Jan. 2, 2024

(54) GENERATING PERSONAS OF USERS OF NETWORKED SERVICES BASED ON ACTIVITIES

(71) Applicant: Amazon Technologies, Inc., Seattle, WA (US)

(72) Inventors: Narjessadat Seyeditabari, Daly City, CA (US); Vinayshekhar Bannihatti Kumar, Santa Clara, CA (US); Rashmi Gangadharaiah, San Jose, CA (US); Deepak Seetharam Nadig, San Jose, CA (US); Ankit Kapoor, Seattle, WA (US); Fayun Luo, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/193,891

(22) Filed: Mar. 31, 2023

(51) Int. Cl.
*H04L 67/50* (2022.01)
*G06F 40/284* (2020.01)
*H04L 67/306* (2022.01)

(52) U.S. Cl.
CPC .......... *H04L 67/535* (2022.05); *G06F 40/284* (2020.01); *H04L 67/306* (2013.01)

(58) Field of Classification Search
None
See application file for complete search history.

(56) References Cited

U.S. PATENT DOCUMENTS

| | | | |
|---|---|---|---|
| 7,644,414 B2 * | 1/2010 | Smith | G06F 8/20 709/227 |
| 9,818,136 B1 * | 11/2017 | Hoffberg | G07F 17/32 |

OTHER PUBLICATIONS

Ghasemisharif et al., "Towards Automated Auditing for Account and Session Management Flaws in Single Sign-On Deployments", May 1, 2022, IEEE, 2022 IEEE Symposium on Security and Privacy (SP) (pp. 1774-1790) (Year: 2022).*

Devlin, J., et al., "BERT: Pre-training of Deep Bidirectional Transformers for Language Understanding," In the 17th Annual Conference of the North American Chapter of the Association for Computational Linguistics: Human Language Technologies (NAACL-HLT), Jun. 2-Jun. 7, 2019, pp. 4171-4186, Minneapolis, Minnesota, Association for Computational Linguistics, URL: https://aclanthology.org/N19-1423.pdf.

Huang, Xin, Ashish Khetan, Milan Cvitkovic, and Zohar S. Karnin. TabTransformer: Tabular Data Modeling Using Contextual Embeddings. arXiv preprint arXiv:2012.06678 (2020), Dec. 11, 2020, URL: https://arxiv.org/pdf/2012.06678.pdf, 17 pages.

(Continued)

*Primary Examiner* — Davoud A Zand
(74) *Attorney, Agent, or Firm* — Athorus, PLLC

(57) ABSTRACT

Clusters of users of networked services are defined based on tasks performed by such users during such networked services. Activities of the users during sessions of the networked services are tracked, and representations of such users or such activities are used to train a model to predict activities of users in the future, including but not limited to services utilized by such users, or pages visited by such users. Subsequently, when a user accesses a networked service during a session, activities of the user may be determined, and a representation of the session is provided as an input to the model, along with contextual information such as an identifier of the persona of the user. A next action, e.g., a service or a page utilized by the user, may be predicted based on outputs received from the model.

20 Claims, 19 Drawing Sheets

(56) References Cited

OTHER PUBLICATIONS

Oba, Daisuke, Naoki Yoshinaga, Shoetsu Sato, Satoshi Akasaki, and Masashi Toyoda. "Modeling personal biases in language use by inducing personalized word embeddings." In Proceedings of the 2019 Conference of the North American Chapter of the Association for Computational Linguistics: Human Language Technologies, vol. 1 (Long and Short Papers). Association for Computational Linguistics, Minneapolis, Minnesota, 2102-2108. URL: https://doi.org/10.18653/v1/N19-1215.

Okura, Shumpei, Yukihiro Tagami, Shingo Ono, and Akira Tajima. "Embedding-based news recommendation for millions of users." In Proceedings of the 23rd ACM SIGKDD International Conference on Knowledge Discovery and Data Mining (Halifax, NS, Canada) (KDD '17). Association for Computing Machinery, New York, NY, USA, 1933-1942. URL: http://library.usc.edu.ph/ACM/KKD%202017/pdfs/p1933.pdf.

Sun, F. et al. "BERT4Rec: Sequential Recommendation with Bidirectional Encoder Representations from Transformer." In the 28th ACM International Conference on Information and Knowledge Management (CIKM '19), Nov. 3-7, 2019, Beijing, China. ACM, New York, NY, USA, pp. 1441-1450, URL: https://doi.org/10.1145/3357384.3357895.

Wu, Chuhan, Fangzhao Wu, Tao Qi, and Yongfeng Huang. "UserBERT: Pre-Training User Model with Contrastive Self-Supervision." In Proceedings of the 45th International ACM SIGIR Conference on Research and Development in Information Retrieval (Madrid, Spain) (SIGIR '22). Association for Computing Machinery, New York, NY, USA, 2087-2092. URL: https://dl.acm.org/doi/abs/10.1145/3477495.3531810.

Yuan, Fajie, Xiangnan He, Alexandros Karatzoglou, and Liguang Zhang. "Parameter-Efficient Transfer from Sequential Behaviors for User Modeling and Recommendation." In Proceedings of the 43rd International ACM SIGIR Conference on Research and Development in Information Retrieval (Virtual Event, China) (SIGIR '20). Association for Computing Machinery, New York, NY, USA, 1469-1478. 2020. Jun. 9, 2020 arXiv:2001.04253, URL: https://arxiv.org/abs/2001.04253.

Zhang, Wei-Nan, Qingfu Zhu, Yifa Wang, Yanyan Zhao, and Ting Liu. "Neural Personalized Response Generation as Domain Adaptation." World Wide Web 22, 4 (Jul. 2019), 1427-1446. Dec. 2, 2019 arXiv:1701.02073 URL: https://arxiv.org/abs/1701.02073.

Zheng, Yinhe, Guanyi Chen, Minlie Huang, Song Liu, and Xuan Zhu. "Personalized Dialogue Generation with Diversified Traits." arXiv preprint arXiv:1901.09672 (2019) URL: https://arxiv.org/abs/1901.09672.

Zheng, Yinhe, Rongsheng Zhang, Minlie Huang, and Mao Xiaoxi. "A Pre-Training Based Personalized Dialogue Generation Model with Persona-Sparse Data." Proceedings of the AAAI Conference on Artificial Intelligence vol. 34, No. 05, pp. 9693-9700. 2020. URL: https://ojs.aaai.org/index.php/AAAI/article/view/6518.

* cited by examiner

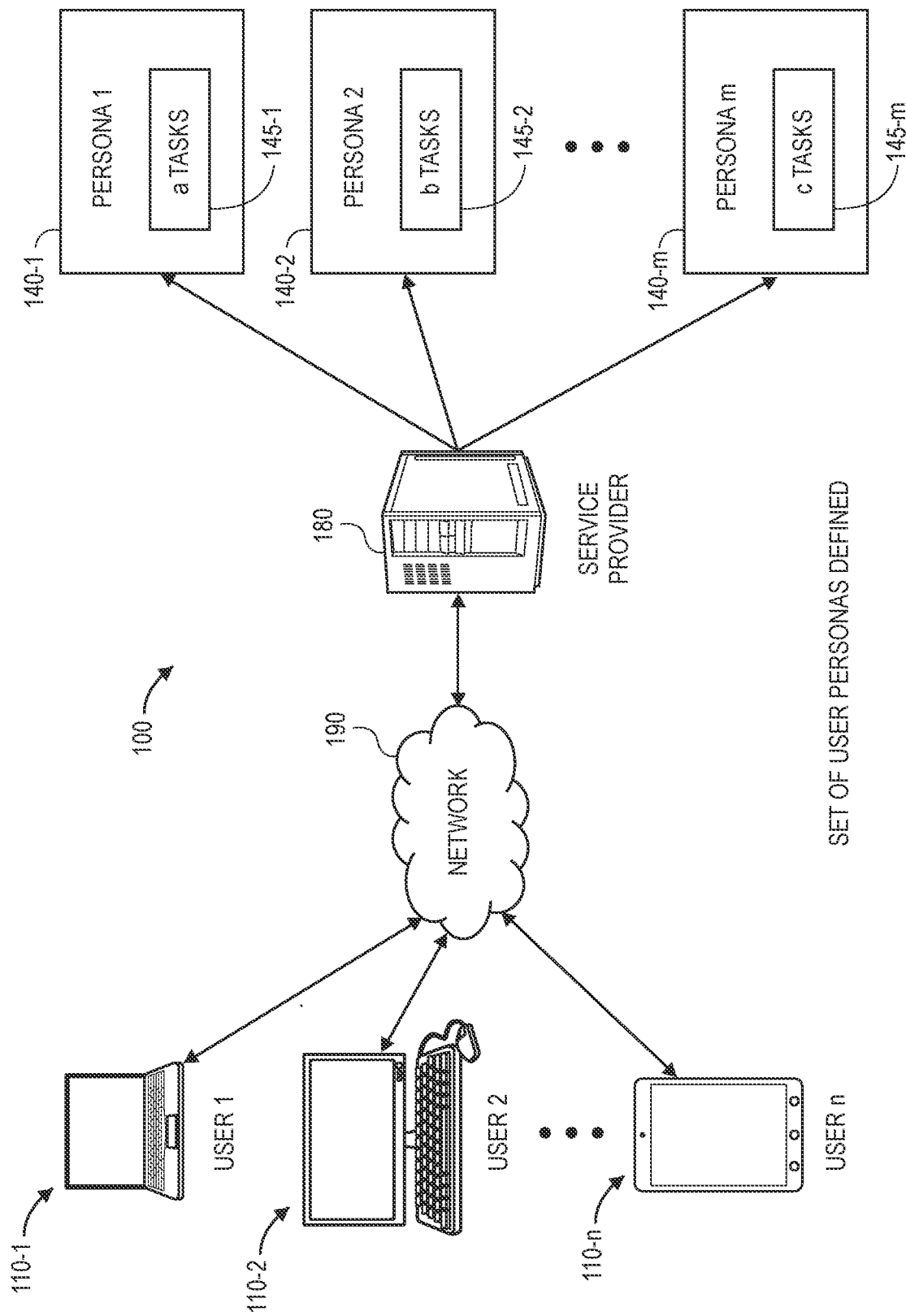

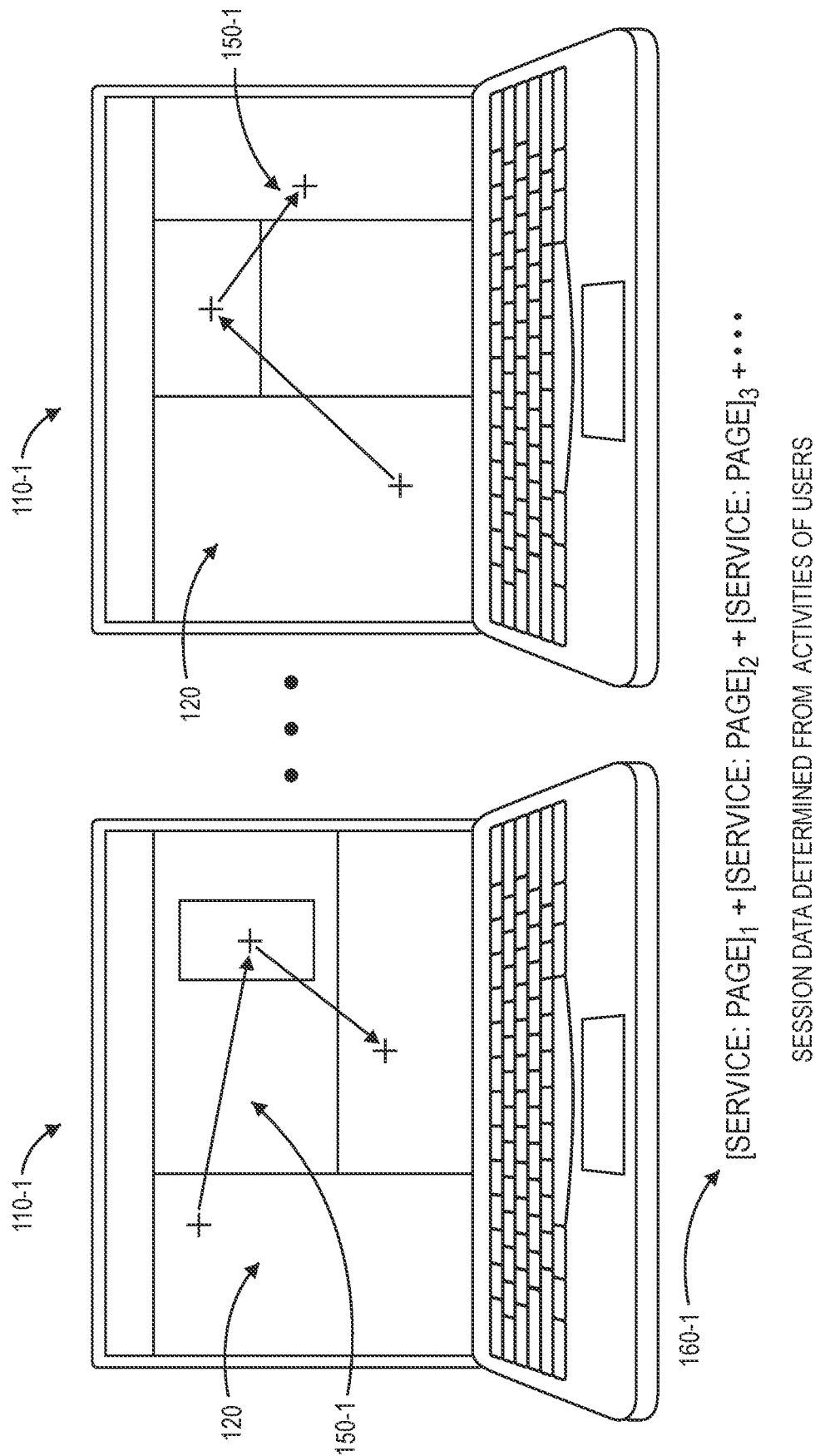

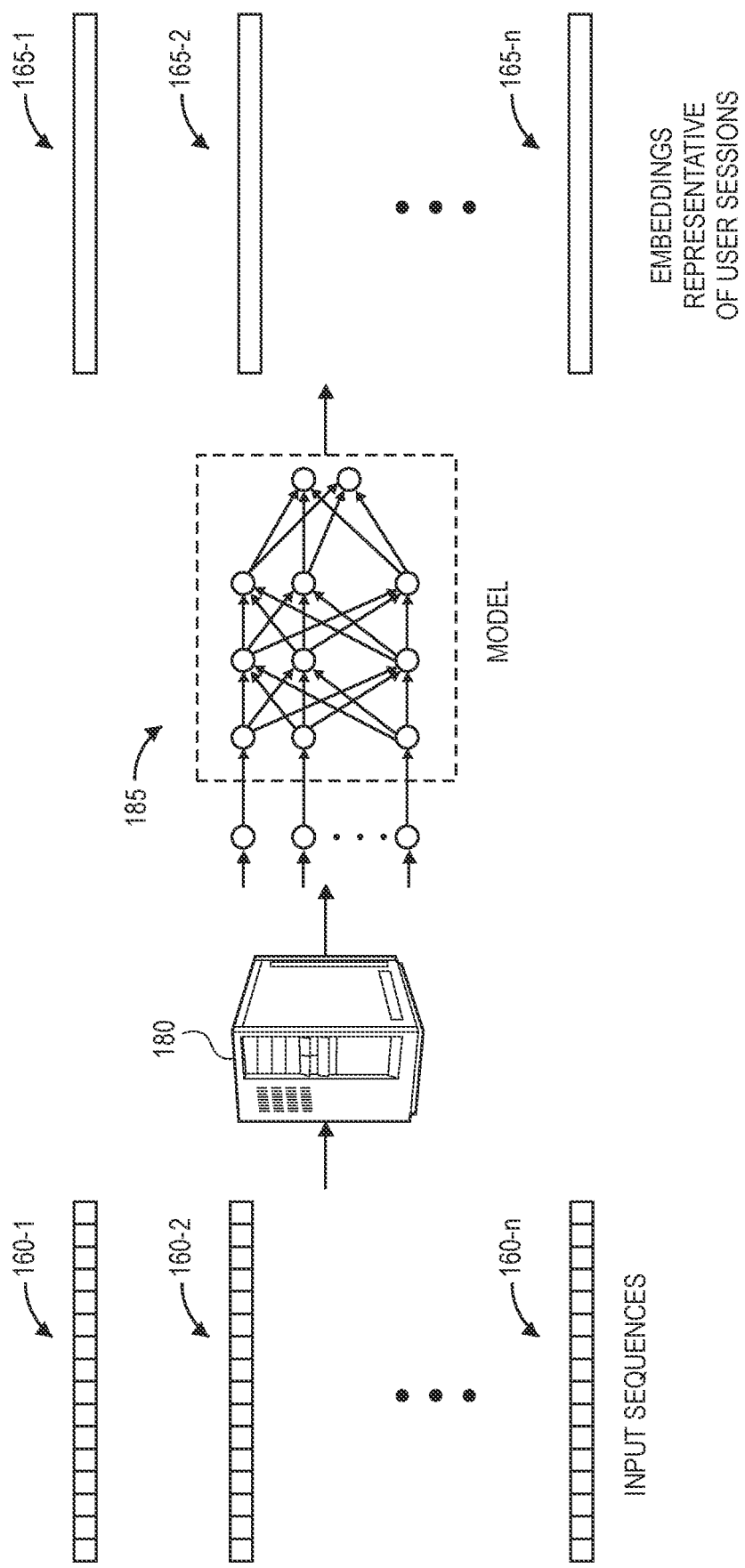

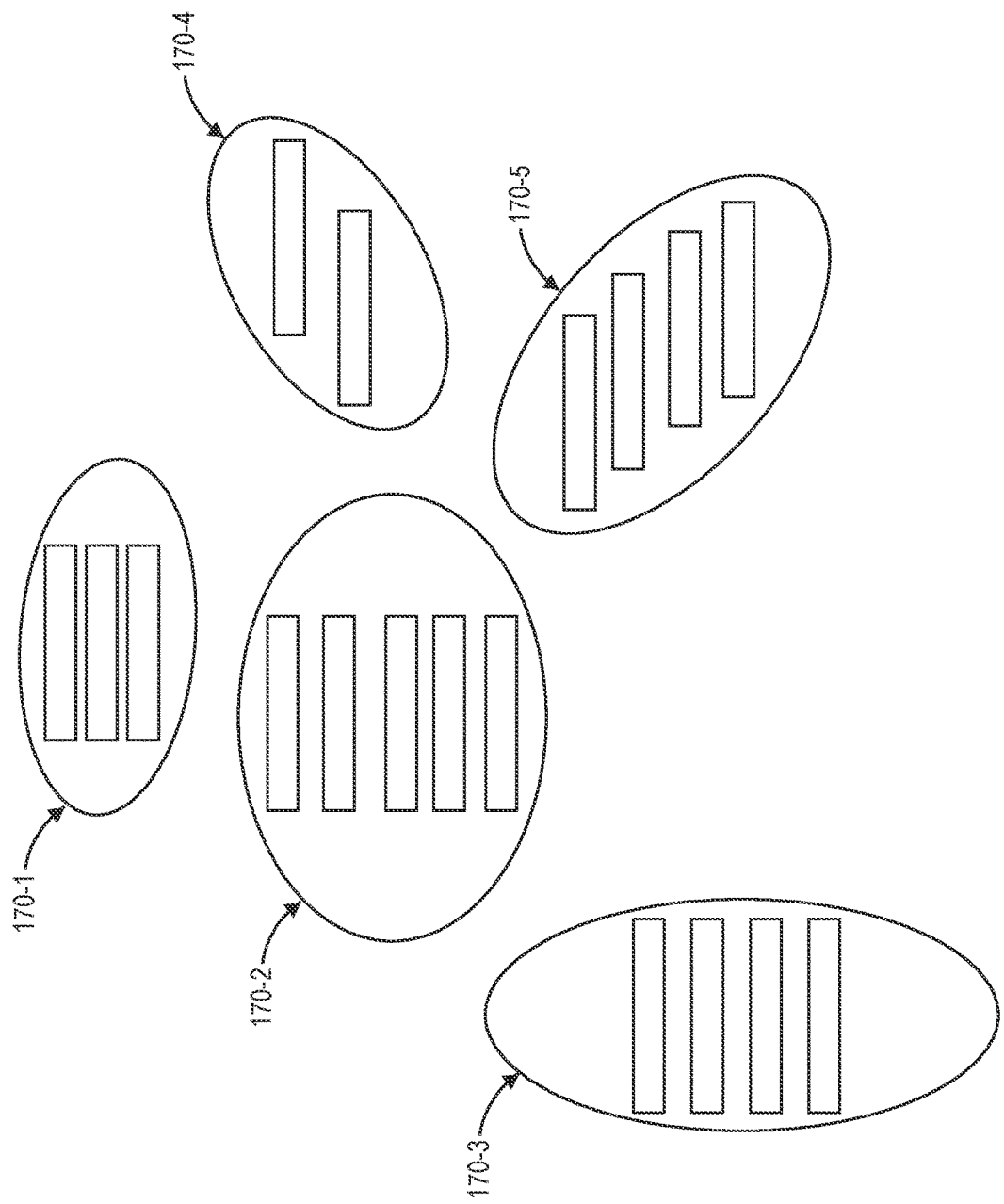

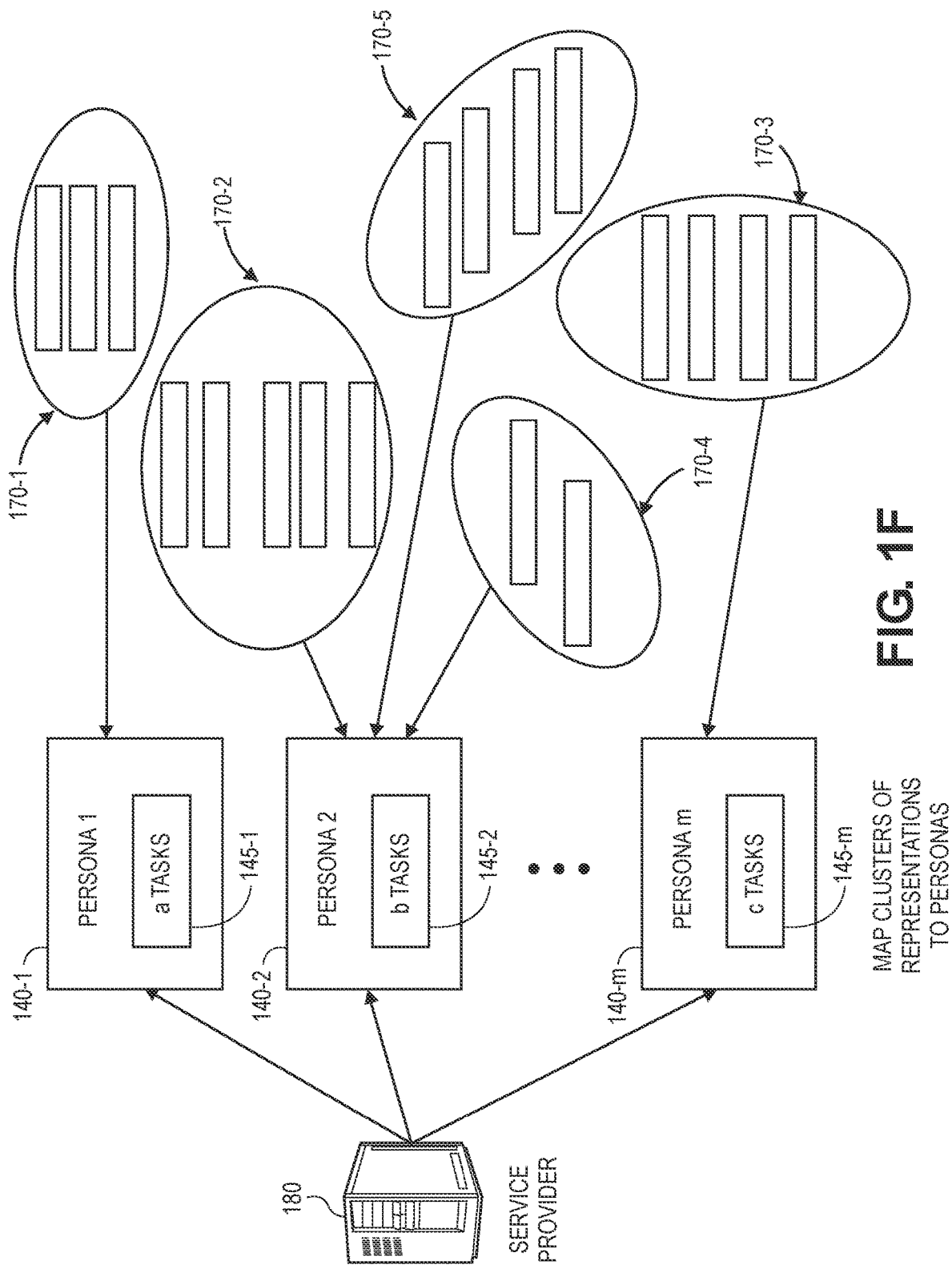

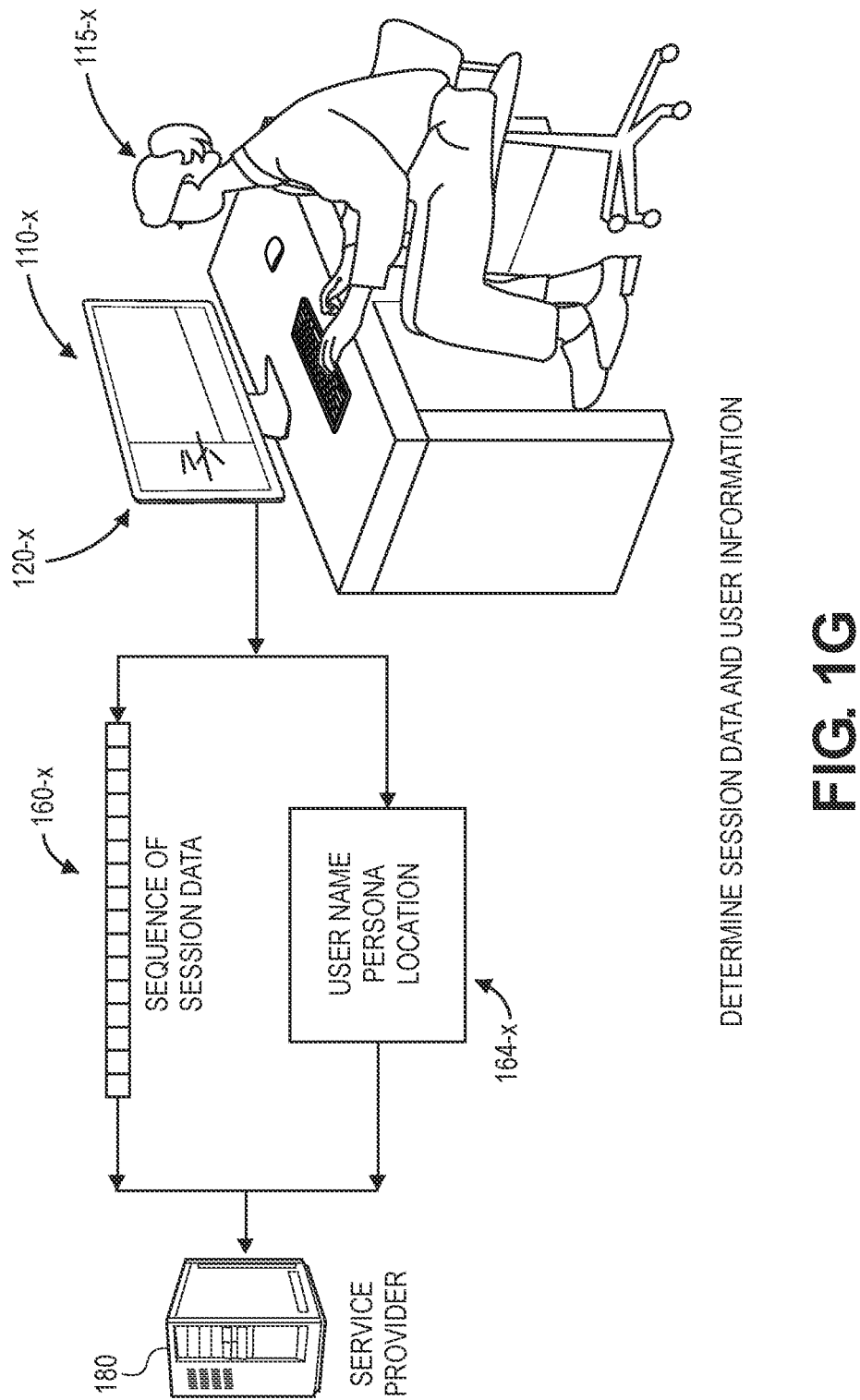

PRESENT RECOMMENDED SESSION/PAGE TO USER

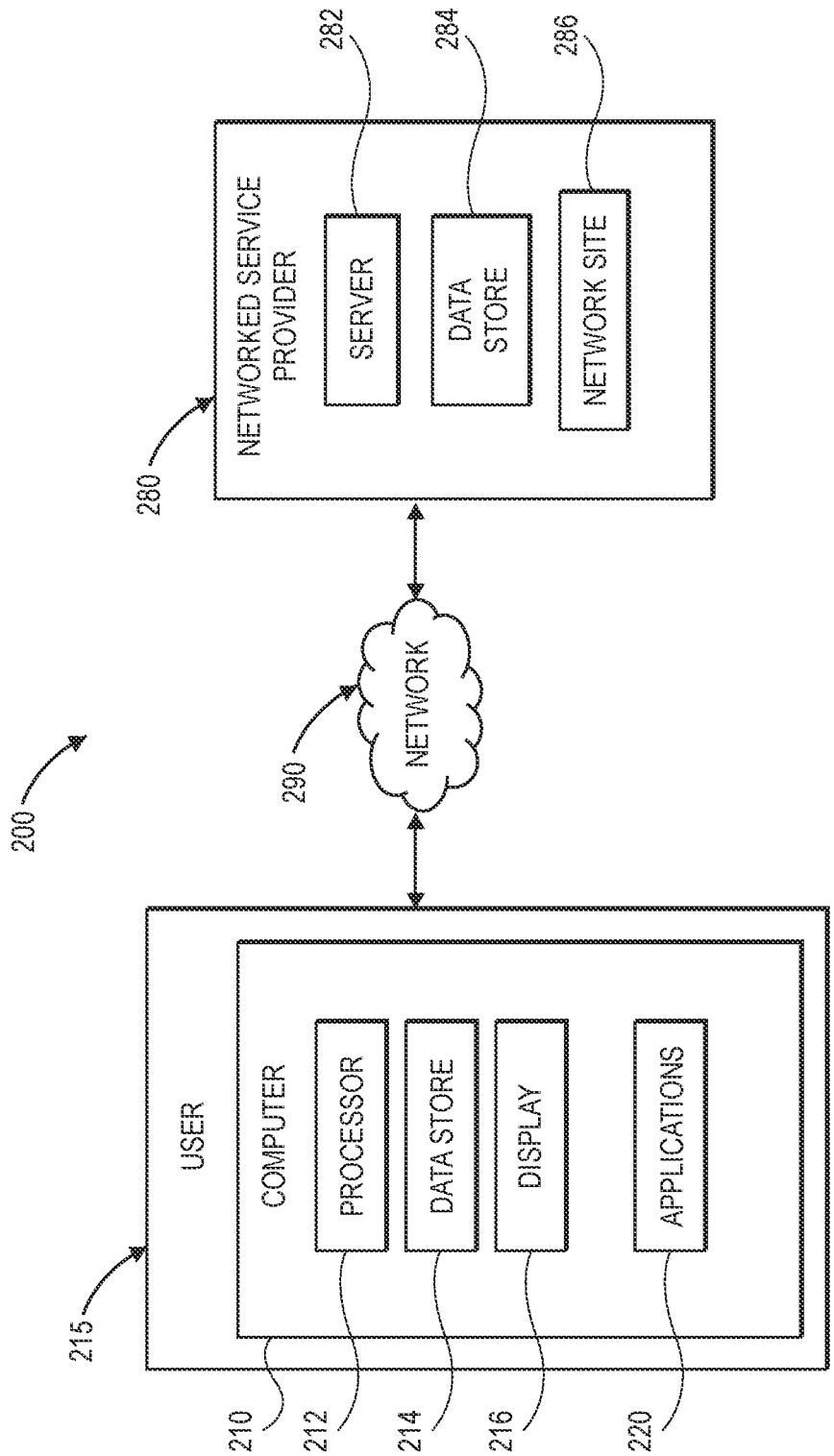

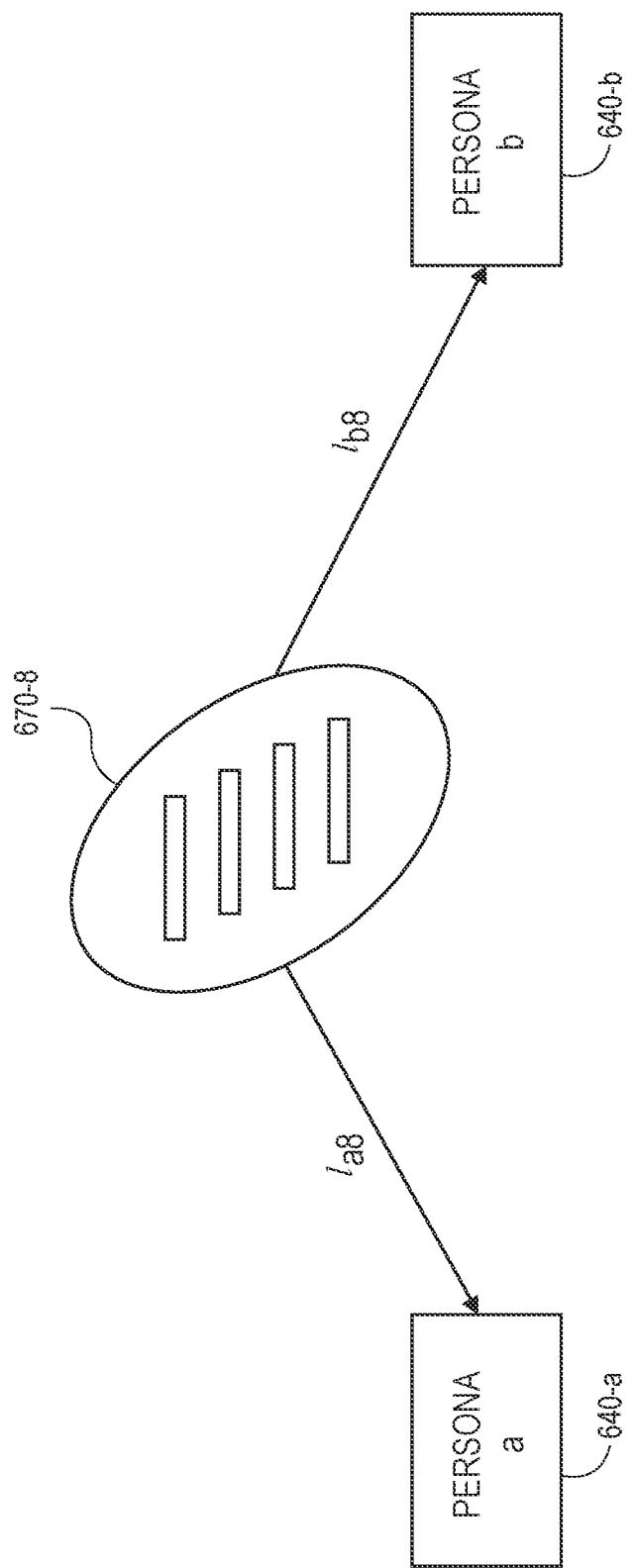

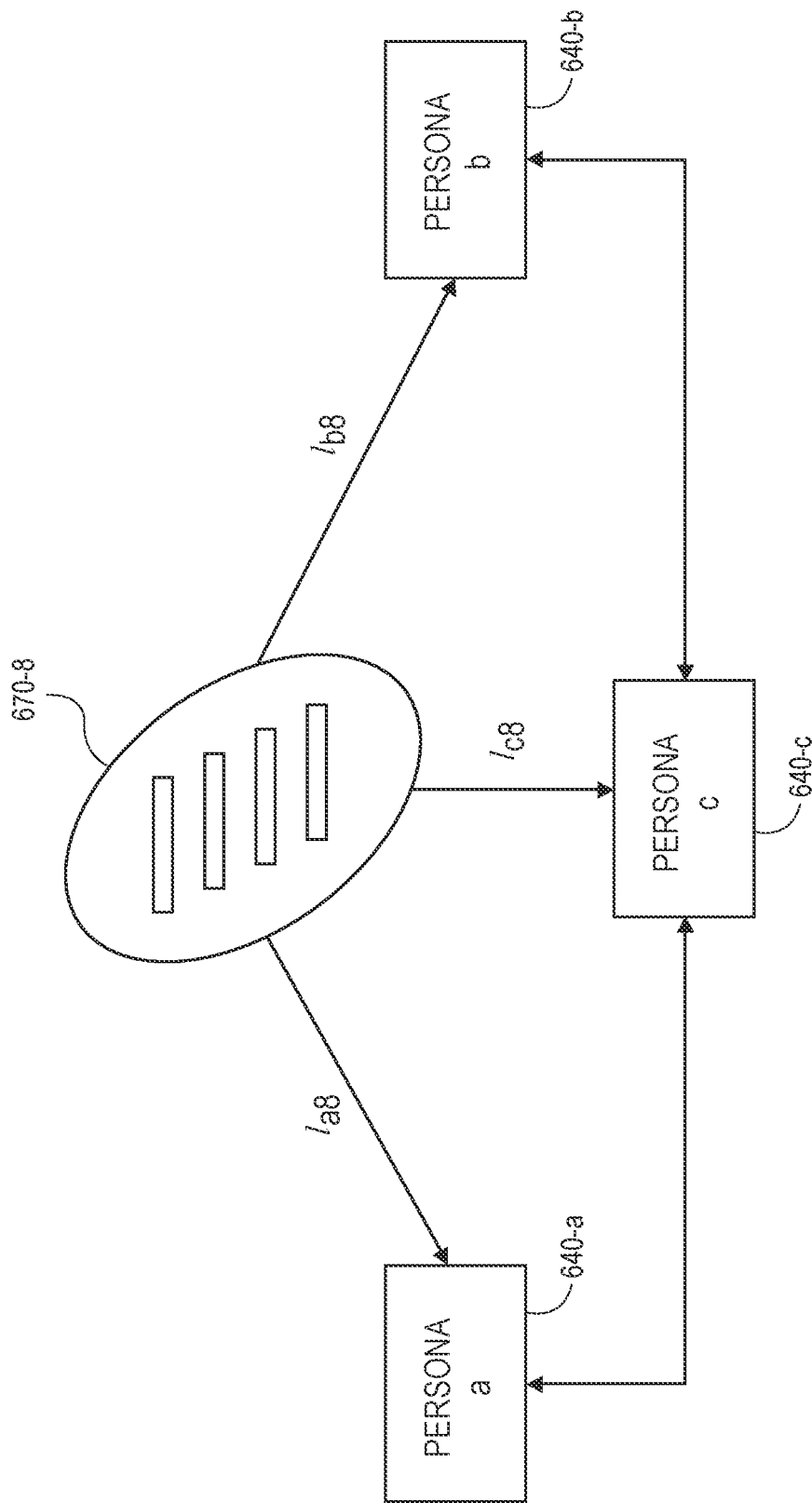

GENERATING PERSONAS OF USERS OF NETWORKED SERVICES BASED ON ACTIVITIES

BACKGROUND

Operators of networked services, or network-based services, may enhance the quality of such services that are provided to users by identifying and recommending content, links to resources or pages or sub-pages that are relevant to the users' specific needs. For example, the ability to accurately predict a goal of a specific user who is using a browser to access a networked site (e.g., a web site) operated by a networked service would enable the networked service to identify a set of information or data consistent with the goal or the need of the user, and present the information or data to the user via the browser quickly and efficiently. Similarly, where a goal of a user of a cloud computing application, a monitoring application, a database management application, an integrated development environment, or any other application or system provided by a networked service, sets of code may be retrieved for execution by the application, along with any information or data to be processed upon executing the sets of code.

BRIEF DESCRIPTION OF THE DRAWINGS

FIGS. 1A through 1I are views of aspects of one system in accordance with embodiments of the present disclosure.

FIGS. 2A and 2B are block diagrams of one system in accordance with embodiments of the present disclosure.

FIGS. 6A through 6C are views of aspects of one system in accordance with embodiments of the present disclosure.

DETAILED DESCRIPTION

As is set forth in greater detail below, the present disclosure is directed to recommending actions to users of networked services, and to generating personas of such users based on their activities. More specifically, systems and methods disclosed herein are directed to determining goals or objectives of users of the networked services and recommending content, links to networked resources, or pages or sub-pages that are relevant to the goals or objectives of the users based on activities of such users. Personas representing aspects of users' experiences with the networked services are determined or identified, e.g., based on survey data obtained from such users, or histories of interactions or other activities of the users, and attributed to specific types or groups of such users. Subsequently, representations of users of the networked services may be clustered based on sequences of activity during prior sessions of such users, and such sequences may identify any services accessed by such users, or pages or sub-pages navigated by such users to reach their respective goals or objectives. The sequences may include text-based identifiers of combinations of services and pages utilized by the customers, which may be separated by tokens and augmented to include other information regarding such users.

Sequences of aggregated session and page information and other information or data regarding users' activities during such sessions, along with billing information, location data or other information or data regarding such users, may be used to train a model to generate representations of the users that may be clustered or otherwise segmented and mapped to defined sets of personas. Once representations of users have been clustered, and clusters of the representations have been mapped to the personas, users may be assigned to one or more of the personas. When a user in a specific persona operates a networked service, a sequence of information including not only activities of the user but also information regarding the user, including an identifier of his or her persona, may be provided to the model and one or more next actions may be predicted for the user based on an output received from the model. A personalized experience may be provided to the user based on the predicted actions.

Where a cluster of representations of users may not be adequately mapped to one of a set of personas, another persona may be generated and the cluster of the representations of such users, and the users themselves, may be assigned to that persona. For example, where a cluster of representations is equidistant or sufficiently remote from two or more personas, a new persona may be formed, and one or more users may be assigned to the persona based on their respective representations.

Figure 1C:
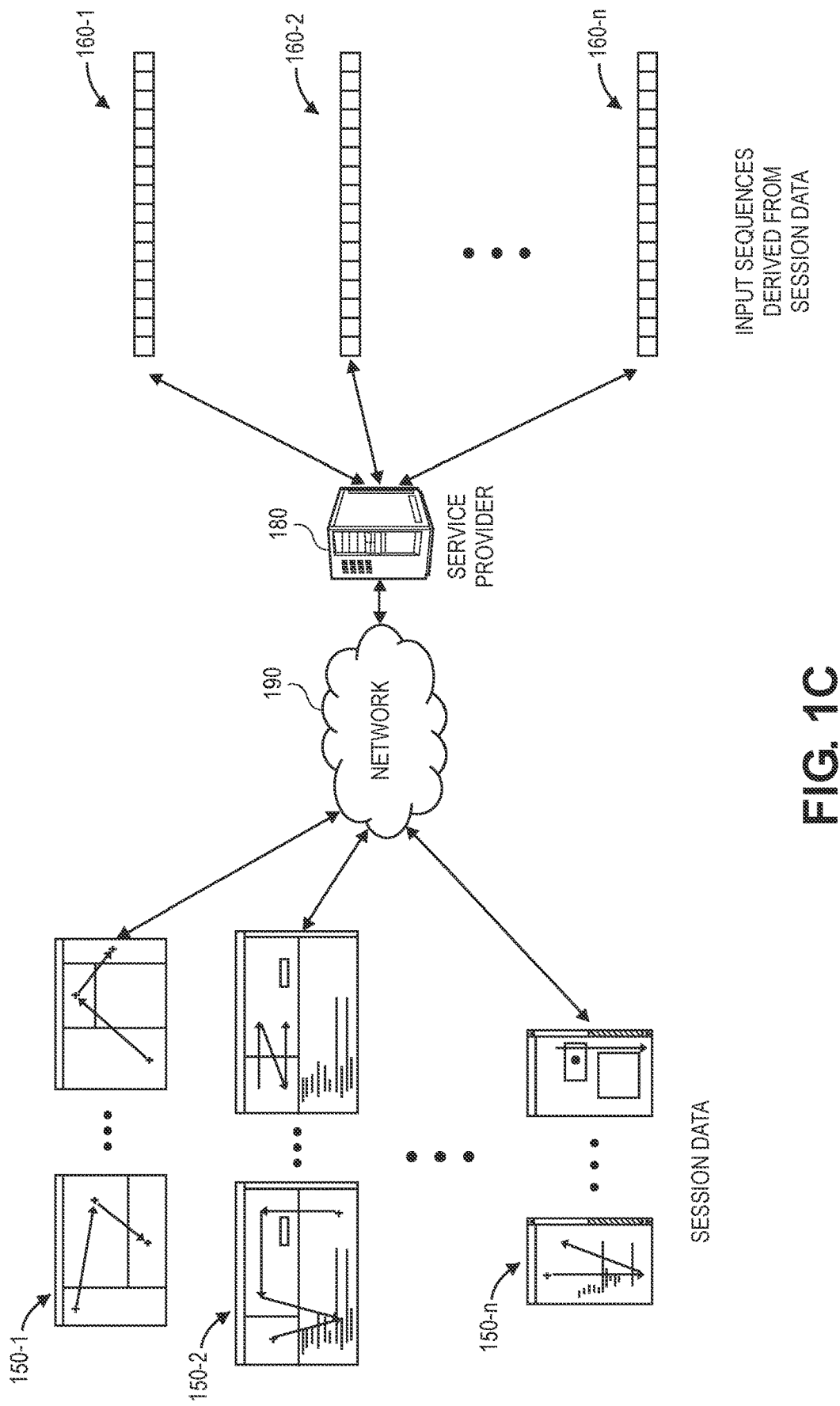

As is shown in FIGS. 1A through 1I, views of aspects of one system 100 for predicting actions in accordance with embodiments of the present disclosure are shown. As is shown in FIG. 1A, a plurality of computer devices (or systems) 110-1, 110-2 . . . 110-n of users of networked services are connected to one or more servers or other computer devices or systems of a networked service provider 180 and any other computer devices or systems (not shown) over one or more computer networks 190, which may include the Internet in whole or in part. Based on information or data received from the computer devices 110-1, 110-2 . . . 110-n, such as results of surveys received from users, or information or data regarding actions of such users during prior sessions, the service provider 180 may define a set of personas 140-1, 140-2 . . . 140-m, which may represent aspects of the experiences of the respective users or others with the networked services of the service provider 180, which may include any browser or web-based applications, cloud computing functions, monitoring applications, database management applications, an integrated development environment, or any other services.

Each of the personas 140-1, 140-2 . . . 140-m may be defined by a set of tasks 145-1, 145-2 . . . 145-m that may be distinct to that persona, or which may be shared with one or more other personas. For example, as is shown in FIG. 1A, the persona 140-1 may be defined by a set of a tasks 145-1, while the persona 140-2 may be defined by a set of b tasks 145-2, and the persona 140-m may be defined by a set of c tasks 145-m. The personas 140-1, 140-2 . . . 140-m may be defined with respect to any number of tasks, which may be selected for or assigned to the respective personas on any basis. Additionally, each of the personas 140-1, 140-2 . . . 140-m may also bear labels identifying such personas, or the set of tasks with which the persona is associated. Such labels may be specifically or randomly applied to a persona based on any of the tasks that are assigned to that persona.

The computer devices 110-1, 110-2 . . . 110-n may be any type or form of computer device, e.g., a desktop computer, a tablet computer, a laptop computer, a smartphone, or others, and may be configured to communicate with the service provider 180 by any number of wired or wireless techniques, and according to any communication protocols.

Session data of a user of a networked service may be determined from information or data representing interactions of the user during one or more sessions. As is shown in FIG. 1B, where a user of an application 120 (e.g., a browser) operating on the computer device 110-1 executes a series of clicks or other interactions with a keyboard, a keypad, a mouse, a stylus, a touch screen, a voice-enabled component or application, or any other device or method for interacting with the computer device 110-1 or the application 120, a set of session data 150-1 regarding such clicks or other interactions (e.g., clickstream data) may be captured and stored. The set of session data 150-1 may represent a record of a path or a sequence of actions undertaken by the user of the computer device 110-1 or the application 120 during the session. Actions of the user may be identified as combinations of services and pages, e.g., [SERVICE:PAGE]$_1$, [SERVICE:PAGE]$_2$, [SERVICE:PAGE]$_3$, and others.

As is shown in FIG. 1C, the service provider 180 may receive session data 150-1, 150-2 . . . 150-$n$ from users of any number of the computer devices 110-1, 110-2 . . . 110-$n$, in a manner similar to that which is shown in FIG. 1B, or in any other manner. Upon or while receiving the session data 150-1, 150-2 . . . 150-$n$, the service provider 180 may generate input sequences 160-1, 160-2 . . . 160-$n$ for each of the sessions of the users from the session data 150-1, 150-2 . . . 150-$n$. The input sequences 160-1, 160-2 . . . 160-$n$ may include text-based identifiers of actions taken by the users, e.g., the services used by the users and pages (or sub-pages) visited or operated by the users. For example, as is shown in FIG. 1C, the input sequence 160-1 of the session data 150-1 may include a plurality of text-based identifiers of sessions and pages, viz., combinations representing a first service and page visited or operated by a user, through a last service and page visited or operated by the user, and such identifiers may be separated by tokens or other features. Similarly, the input sequence 160-2 of the session data 150-2 includes a plurality of text-based identifiers of sessions and pages, viz., combinations representing a first service and page visited or operated by a user, through a last service and page visited or operated by the user, separated by tokens or other features, while the input sequence 160-$n$ of the session data 150-$n$ includes a plurality of text-based identifiers of sessions and pages, viz., combinations representing a first service and page visited or operated by a user, through a last service and page visited or operated by the user. Alternatively, the input sequences 160-1, 160-2 . . . 160-$n$ may include any number of other alphanumeric characters or other information or data, e.g., tokens separating the respective text-based identifiers, as well as information or data regarding the sessions or the users, such as locations of the users, billing histories of the users, or any other information or data.

Input sequences representing session data of users may also be used to train a model to generate representations of the users, and to identify or predict next actions of the users based on such representations. As is shown in FIG. 1D, the service provider 180 may provide a set of training inputs including the input sequences 160-1, 160-2 . . . 160-$n$ of the users to a model 185, and the model 185 may learn to generate representations 165-1, 165-2 . . . 165-$n$ of the users based on the training inputs.

The model 185 may be any type or form of machine learning algorithm, system or technique. In some implementations, the model 185 may include any number of transformers having one or more attention mechanisms, e.g., a bidirectional encoder representations from transformer (or "BERT"). Where the model 185 includes a BERT, the BERT may have any number of layers, each of which may be configured to learn different contextual information from the respective representations. Alternatively, the model 185 may be any type or form of model other than a BERT, e.g., a principal component analysis; a singular value decomposition; a deep learning system; a nearest neighbor method or analysis; a factorization method or analysis; a generative model; a gradient boosted decision tree; a support vector machine; a similarity measure, or others.

The representations 165-1, 165-2 . . . 165-$n$ may be any embeddings or another representation of discrete variables as continuous vectors. The representations 165-1, 165-2 . . . 165-$n$ may be a comparatively low-dimensional space into which high-dimensional vectors may be translated. The representations 165-1, 165-2 . . . 165-$n$ may capture semantics inputs, viz., the input sequences 160-1, 160-2 . . . 160-$n$, by placing semantically similar inputs close to one another within an embedding space.

Representations of users and their respective activities generated from inputs sequences of session data may also be clustered into segments representing sets of the users. As is shown in FIG. 1E, the representations 165-1, 165-2 . . . 165-$n$ may be clustered into a plurality of clusters 170-1, 170-2, 170-3, 170-4, 170-5 according to a clustering algorithm, e.g., a K-means clustering algorithm, or others.

Once the representations of the users have been clustered, the clustered representations may be mapped to personas of such users. Referring to FIG. 1F, the clusters 170-1, 170-2, 170-3, 170-4, 170-5 may be mapped to the personas 140-1, 140-2 . . . 140-$m$ determined in FIG. 1A in any manner or according to any technique. In some implementations, personas may be mapped to clusters by generating one-hot encodings for each persona. The one-hot encodings generated for each persona may have lengths corresponding to a total number of tasks, and values of 1 for tasks that are included in a definition of the persona, and values of 0 for tasks that are not included in the persona. Probabilities (e.g., conditional probabilities) that a given task of a persona may be included in a representation of a cluster may be calculated, and probability distributions of clusters being assigned to specific personas may be calculated. A persona having a maximum probability distribution with a cluster, e.g., a persona nearest to that cluster, will be the persona assigned to that cluster. Alternatively, where a cluster of representations is equidistant from two or more personas, e.g., where the probability distribution of the cluster is not sufficiently high, or where the cluster is not sufficiently close to one persona, a new persona may be formed based on the representations of the users of the cluster, or the tasks performed by such users.

Users corresponding to each of the representations within a cluster that has been mapped to a persona may thus be assigned to that persona, or presumed to be associated with that persona.

Subsequently, when a user initiates a session with one or more of the networked services, a next action of the user may be predicted based on session data and any other information or data regarding the user, which may include one or more identifiers of a persona to which the user has been assigned. As is shown in FIG. 1G, a user 115-$x$ of a computer device 110-$x$ operates one or more applications 120-$x$ associated with a networked service provided by the service provider 180. A sequence of session data 160-$x$ including text-based identifiers of sessions and pages, viz., combinations representing a first service and page visited or operated by the user 115-$x$, through a last service and page visited or operated by the user 115-$x$, is captured by the application 120-$x$ and transmitted to the service provider 180, along with user-specific information 164-$x$ such as an identifier (e.g., a user name) of the user 115-$x$, an identifier of one of the personas 140-1, 140-2 . . . 140-$m$ determined in FIG. 1A to which the user 115-$x$ has been assigned, and a location of the user 115-$x$.

Figure 1H:
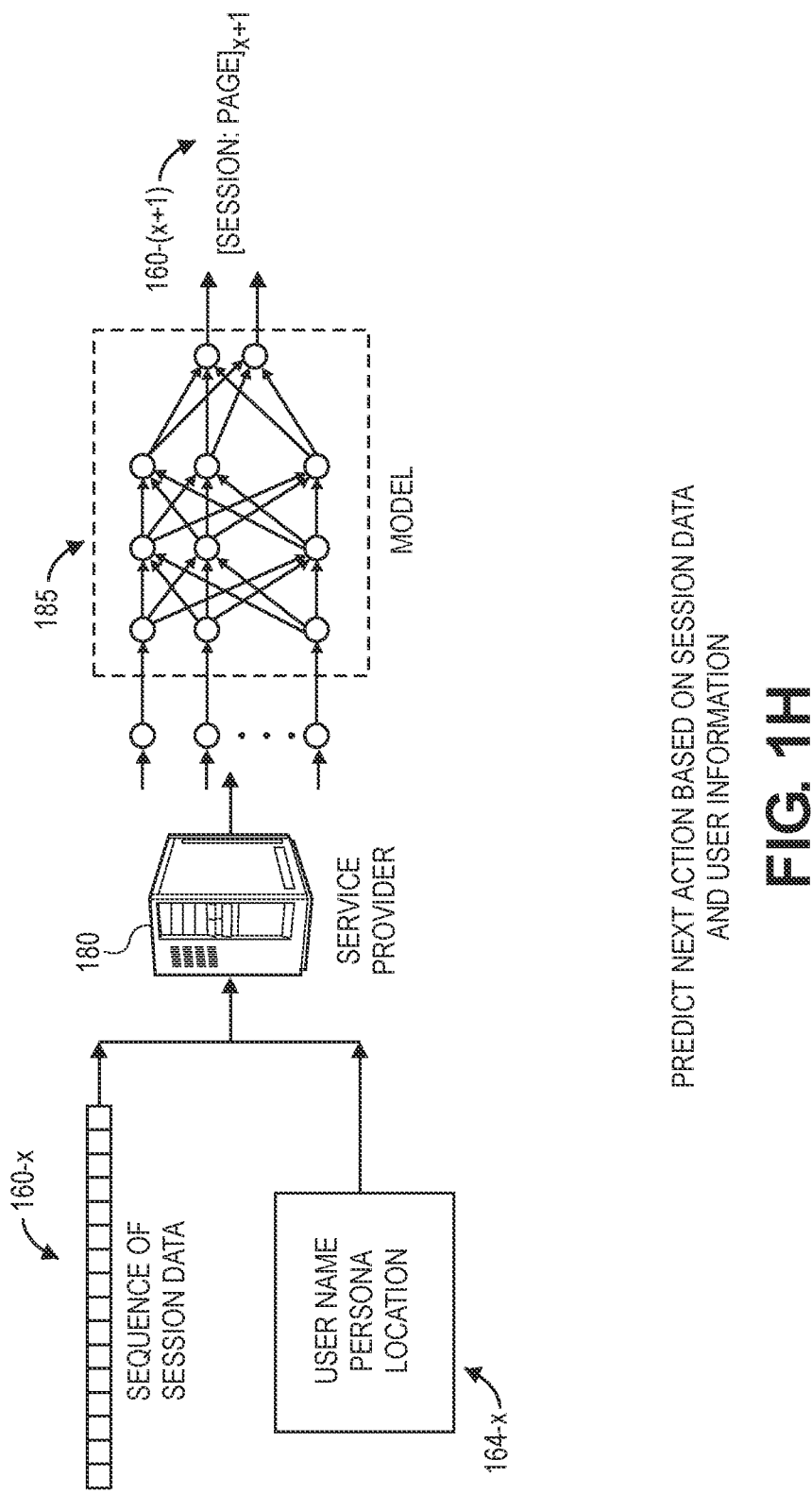
Figure 1I:
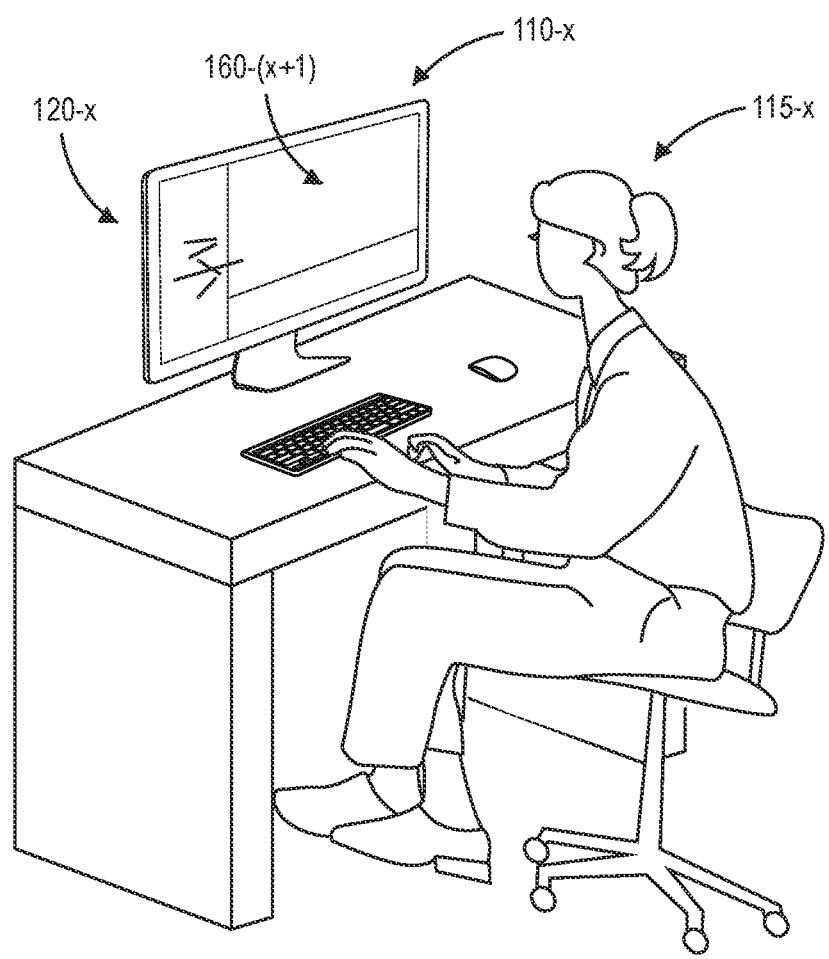

As is shown in FIG. 1H, the service provider 180 may provide the sequence of session data 160-$x$ and the user-specific information 164-$x$ as inputs to the trained model 185, and a next action 160-($x$+1) may be predicted or selected for the user 115-$x$ based on an output received from the trained model 185 in response to the inputs. As is shown in FIG. 1I, a service or a page associated with the next action 160-($x$+1), viz., a combination [SESSION:PAGE]$_{x+1}$ is caused to be displayed or rendered by the computer device 110-$x$.

Figure 2B:
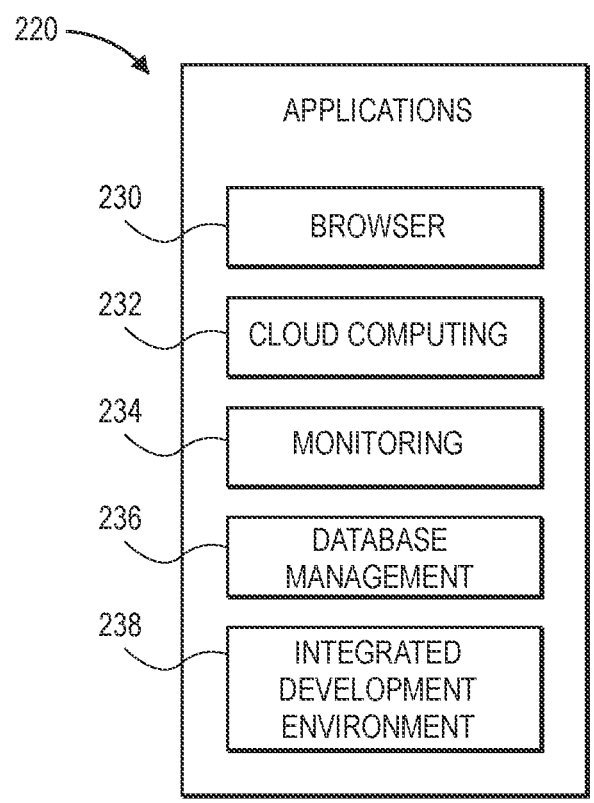

Referring to FIGS. 2A and 2B, block diagrams of one system 200 in accordance with embodiments of the present disclosure are shown. Except where otherwise noted, reference numerals preceded by the number "2" shown in FIG. 2A or 2B indicate components or features that are similar to components or features having reference numerals preceded by the number "1" shown in FIGS. 1A through 1I.

As is shown in FIG. 2A, a computer 210 operated by a user 215 and a networked service provider 280 are connected to one another over a network 290, which may include the Internet in whole or in part.

The user 215 may be any owner, operator or user of the computer 210, or any other like machine that may operate or access one or more software applications. For example, the computer 210 may be or comprise a device that is specifically programmed or adapted for one or more purposes (e.g., receiving entries or modifications to code) or a general purpose device such as a desktop computer, a tablet computer, a laptop computer, a smartphone, a personal digital assistant, a digital media player, a television, an appliance or an automobile, or any other general purpose device, and may include any form of input and/or output peripherals such as scanners, readers, keyboards, keypads, touchscreens, pointing devices or voice-enabled components or applications. The computer 210 may be connected to or otherwise communicate with the networked service provider 280 or any other computer devices or systems over the network 290, by the transmission and receipt of digital data.

The computer 210 is configured to execute one or more computer programs or applications for hosting one or more applications 220 (e.g., browsers, cloud computing functions, monitoring applications, database management applications, an integrated development environment or any other applications) that may be operated by the user 215. As is shown in FIG. 2A, the computer 210 may be any type or form of computer device or system having one or more processors 212, one or more data stores 214 and one or more displays 216. For example, the computer 210 may be a desktop computer, a laptop computer, a mobile device (e.g., a smartphone or a tablet computer), or any other computer device or system.

The applications 220 may be any type or form of software, program, package or other set of code for performing one or more functions on behalf of a user, viz., the user 215, or another application executed by the computer 210 or any other computer device or system. As is shown in FIG. 2B, in some implementations, the applications 220 may include a browser 230, or any other client-side software applications that are configured to receive resources hosted on one or more server-side systems, e.g., the networked service provider 280, and to process and render such resources on one or more computing displays in response to a request for such content. Such request may include, for example, a Uniform Resource Identifier ("URI"), such as a Uniform Resource Locator (or "URL"), associated with a network-based resource that includes the requested content, or another location of files that include the requested content. In some implementations, the user 215 may provide a request for network-based content by an entry of a URI or a URL into an address box or address bar of the browser 230, a selection of an image or set of text that is rendered by the browser 230 or another application and may be hyperlinked to a URI or a URL, or a selection of a bookmark, a "home" button or any other feature of the browser 230 that may be hyperlinked to or otherwise associated with a URI or a URL. Upon receiving a request from the browser 230, a server associated with the URI or URL may handle the request by providing code expressed in one or more computer languages, such as Hypertext Markup Language (or "HTML"), to the browser 230, which may then interpret the code, or execute one or more rendering engines (or layout engines) to render the code into a page, which may include one or more files embedded within the code provided by the server.

In some implementations, the applications 220 may include a cloud computing application 232, or any other application for providing services to clients over the network 290 e.g., from the networked service provider 280, or by the networked service provider 280. For example, the cloud computing application 232 may be any application for providing infrastructure as a service, platforms as a service, software as a service, or other services via pooled or scalable computing resources over the network 290.

In some implementations, the applications may include a monitoring application 234, or any other application for monitoring or managing devices, systems or resources (e.g., physical or virtual resources) over the network 290, e.g., by the networked service provider 280, according to any protocol. The monitoring application 234 may be used to map network components, track uptime or downtime of any systems or devices, generate alerts, monitor bandwidth or processing power or capacity, and otherwise track the health of a network or the systems or devices thereon.

In some implementations, the applications may include a database management application 236, or any other application for optimizing, managing, storing or retrieving data, or otherwise making the data available to one or more external resources e.g., by the networked service provider 280.

In some implementations, the applications may include an integrated development environment 238, or any module, application or feature that assists the user 215 in developing software code efficiently using the computer 210. The integrated development environment 238 may combine capabilities such as software editing, building, testing, and packaging computer programs (e.g., entering and modifying code) in an easy-to-use application via a common user interface. The integrated development environment 238 may include one or more of an editor, a debugger, an autonomation tool and a compiler, among other modules or features. In some implementations, the integrated development environment 238 may operate locally on the computer 210. Alternatively, the integrated development environment 238 may operate remotely on one or more virtual or "cloud"-based computer devices or systems, and the user interfaces of the integrated development environment 238 may be rendered on the display 216 by way of the browser 230 or in any other manner.

In addition to the applications 220, those of ordinary skill in the pertinent arts will recognize that the computer 210 may operate any number of other software applications including but not limited to E-mail clients, social network applications, word processing, personal management or mapping applications, or feature one or more hardware components including but not limited to one or more sensors (e.g., a cellular telephone transceiver, a Global Positioning Service receiver, an accelerometer, a gyroscope or a compass).

As is shown in FIG. 2A, the networked service provider 280 may be any module, engine, application or system configured to provide services to any other computer devices or systems, such as the computer 210 or others (not shown), over the network 290 or otherwise.

The networked service provider 280 may operate a networked computer infrastructure, including one or more physical computer servers 282 and data stores (e.g., databases) 284 for hosting a network site 286 (e.g., a web site), and may be physically or virtually associated with the integrated development environment 220 or any other modules. The network site 286 may be implemented using the one or more servers 282, which connect or otherwise communicate with the one or more data stores 284 as well as the network 290, through the sending and receiving of digital data. The servers 282 may cause the display of information associated with the network site 286 in any manner, e.g., by transmitting code such as Hypertext Markup Language (or "HTML") code over the network 290 to another computing device that may be configured to generate and render the information into one or more pages and to display such pages on a computer display of any kind.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, voice-enabled component or application, or other device (not shown) or method to interact with the computers, servers, devices and the like, or to "select" an item, link, node, hub or any other aspect of the present disclosure.

The computer 210 or the servers 282, or any other computer devices or systems of the system 200 (not shown), may use any web-enabled or Internet applications or features, or any other client-server applications or features, to connect to the network 290, or to communicate with one another. For example, the computer 210 or the servers 282 may be adapted to transmit information or data in the form of synchronous or asynchronous messages in real time or in near-real time, or in one or more offline processes, via the network 290. Those of ordinary skill in the pertinent art would recognize that the user 215 or the networked service provider 280 may operate, include or be associated with any of a number of computing devices that are capable of communicating over the network 290. The protocols and components for providing communication between such devices are well known to those skilled in the art of computer communications and need not be described in more detail herein.

The data and/or computer executable instructions, programs, firmware, software and the like (also referred to herein as "computer-executable" components) described herein may be stored on a computer-readable medium that is within or accessible by computers or computer components of the user 215 or the networked service provider 280, or any other computer devices or systems of the system 200 (not shown), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
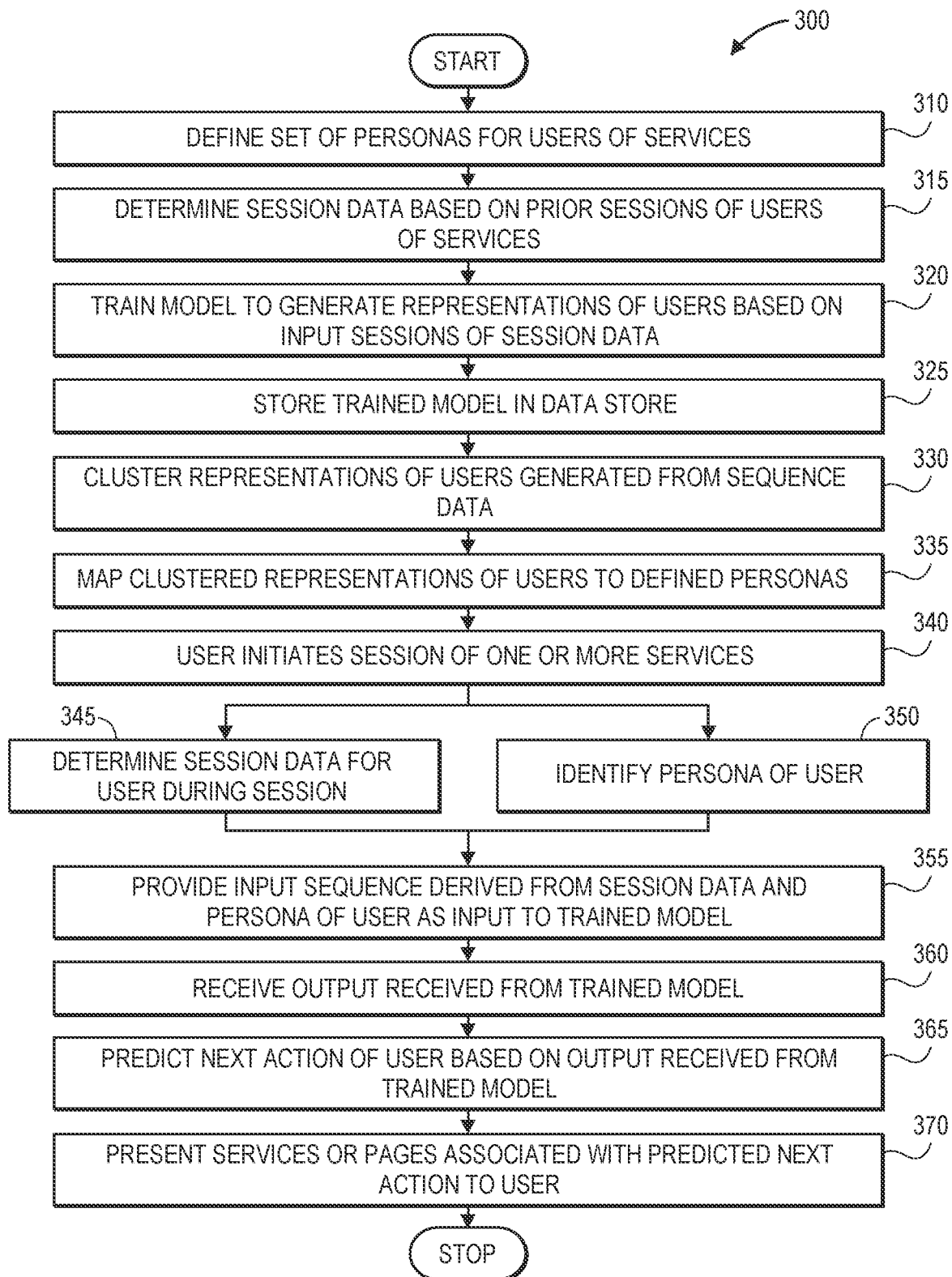
FIG. 3 is a flow chart of one process in accordance with embodiments of the present disclosure.

Referring to FIG. 3, a flow chart 300 of one process in accordance with embodiments of the present disclosure is shown.

At box 310, a set of personas is defined for users of one or more services. A persona may represent aspects of the respective users' experiences with services that may be determined and attributed to a specific type or group of user. For example, a survey, a questionnaire, or another request for information or data may be generated and circulated to the users of the services, who may manually or automatically identify tasks or functions that each of such users typically executes via the services during one or more sessions. Alternatively, histories of interactions or other activities of such users of the services may be identified and determined.

Each persona may be defined by a set of tasks that may be distinct to that persona, or which may be shared with one or more other personas. For example, in some implementations, one persona may be assigned a task such as "monitoring," and another persona may be assigned a task such as "cost management," while both of the personas may also be assigned a task such as "exploration of new services." Any number of personas may be identified and defined for a set of users of the services.

Additionally, each persona may also bear a label that generally or specifically identifies the persona, or the set of tasks with which the persona is associated. For example, personas may be labeled "DEVOPS," "Developer," "Information Technology Professional," "Cloud Architect," "Information Technology Leader," "Business User," "Decision Maker," or any other label that may be specifically or randomly applied to a persona based on any of the tasks that are assigned to that persona.

At box 315, session data is determined based on prior sessions of the users of the services. The session data may include, but need not be limited to, a record or set of transactions of such users during any of their prior sessions, e.g., trajectories, as well as billing information for such users, geographical information (e.g., geolocations), services, pages or sub-pages navigated by the users, or any other information or data regarding experiences of the users during the prior sessions.

At box 320, a model is trained to generate representations of users based on input sequences of session data of the users during the prior sessions. In some implementations, the model may be a transformer model having one or more attention mechanisms, e.g., a bidirectional encoder representations from transformer (or "BERT"). In some other implementations, the model may be a principal component analysis; a singular value decomposition; a deep learning system; a nearest neighbor method or analysis; a factorization method or analysis; a generative model; a gradient boosted decision tree; a Random Forest algorithm; a support vector machine; a similarity measure, or others.

The model may be trained using a set of training inputs including the session data determined at box 315. For example, the training inputs may include sequences of sets of text describing the session data, e.g., session locations, billing features, and sequences of activities identifying both services utilized by such users and pages or sub-pages (e.g., widgets, application programming interfaces, or other features) visited or operated by such users. The sequences of session data may be effectively constructed as sentences summarizing activities of each of such users.

At box 325, the trained model is stored in one or more data stores. For example, the trained model may be stored as one or more sets of code that, when executed, cause the model to be performed on one or more sets of data. In some implementations, the trained model may be stored in association with a device or system that provides the one or more services that are offered to users. In some other implementations, the trained model may be stored separately, e.g., in one or more alternate or virtual locations, such as in a "cloud"-based environment.

At box 330, representations of users generated from the input sequences of session data are clustered. In some implementations, each of the representations may be processed according to a clustering algorithm, e.g., a K-means clustering algorithm that uses a cosine similarity or another measure as a distance metric. In some implementations, the representations may be processed according to a density-based clustering algorithm, a distribution-based clustering algorithm, a centroid-based clustering algorithm, a hierarchical-based clustering algorithm, or any other type or form of clustering algorithm, which may be unsupervised or supervised. For example, the clustering algorithm may be a BIRCH algorithm, a DBSCAN algorithm, or any similar algorithm.

At box 335, the clustered representations of the users are mapped to the personas. In some implementations, clusters of representations may be mapped to respective personas, which represent combinations of sets of tasks. For example, a set of activities that are most commonly performed by users of a given cluster may be identified, e.g., as combinations of services and pages within such services visited or operated by such users. Activities that are most commonly performed by all users may also be mapped to specific tasks within each cluster.

In some implementations, personas may be mapped to clusters by generating one-hot encodings for each persona. The one-hot encodings generated for each persona may have lengths corresponding to a total number of tasks, and values of 1 for tasks that are included in a definition of the persona, and values of 0 for tasks that are not included in the persona. Probabilities that a given task of a persona may be included in a cluster may be calculated, and probability distributions of clusters being assigned to specific personas may be calculated. A persona having a maximum probability distribution with a cluster will be the persona assigned to that cluster.

Moreover, in some implementations, where a clustered representation of users may not be adequately mapped to one of a set of personas, another persona may be generated and the cluster of the representations of such users, and the users themselves, may be assigned to that persona. For example, where a cluster of representations is equidistant or sufficiently remote from two or more personas, a new persona may be formed, and one or more users may be assigned to the persona based on their respective representations.

At box 340, a user initiates a session of one or more services. For example, the user may access one or more networked services initiated via one or more network sites (e.g., web sites) or applications and accessing or updating data stored in one or more databases, applications, sets of code or other systems or data.

At box 345, session data is determined for the user who initiated the session at box 340. As with the session data determined at box 315, the session data may include, but need not be limited to, a set or record of transactions of the user during the session, billing information for the user during the session, geographical information of the user, services utilized by the user, pages or sub-pages used or operated by the user, or any other information or data regarding an experience of the user.

In parallel, at box 350, a persona of the user who initiated the session at box 340 is identified. In some implementations, where information or data the user or his or her history of activities in one or more sessions is available, the information or data may be used to assign the user to a persona, or the user may have previously been assigned to the persona. For example, where information or data regarding a prior session of the user is known, and a representation (e.g., an embedding) of the user is generated based on the information or data, a cosine similarity may be calculated between the representation of the user and centroids of each of the clusters. A cluster having a centroid with that is closest to the representation of the user may be identified, and the user may be assigned to that cluster.

At box 355, an input sequence derived from the session data determined at box 340 and the persona of the user identified at box 350 is provided as an input to the model trained at box 320. For example, as is discussed above, the input sequence may take any form, and may include one or more sequences of sets of text describing the session data determined at box 345, e.g., a location, one or more billing features, or one or more sequences of activities by the user, such as services utilized by the user and pages or sub-pages (e.g., widgets, application programming interfaces, or other features) visited or operated by the user, and such sequences may be separated by one or more tokens. The input sequence may further include sequences of sets of text describing the persona of the user, or any other information or data regarding the user. The input sequence of session data may be effectively constructed as sentences summarizing activities of each of such users.

At box 360, an output is received from the trained model.

At box 365, a next action of the user who initiated the session at box 340 is predicted based on the output received from the trained model at box 360. For example, a service associated with the networked service provider, or a page of such a service, or both a service and a page, may be identified based on the output received at box 360. A next action may be predicted based on the output. Alternatively, any other type or form of next action that might be taken by the user may be identified based on the input sequence.

At box 370, services or pages associated with the predicted next action are presented to the user at box 365, and the process ends.

Figure 4A:
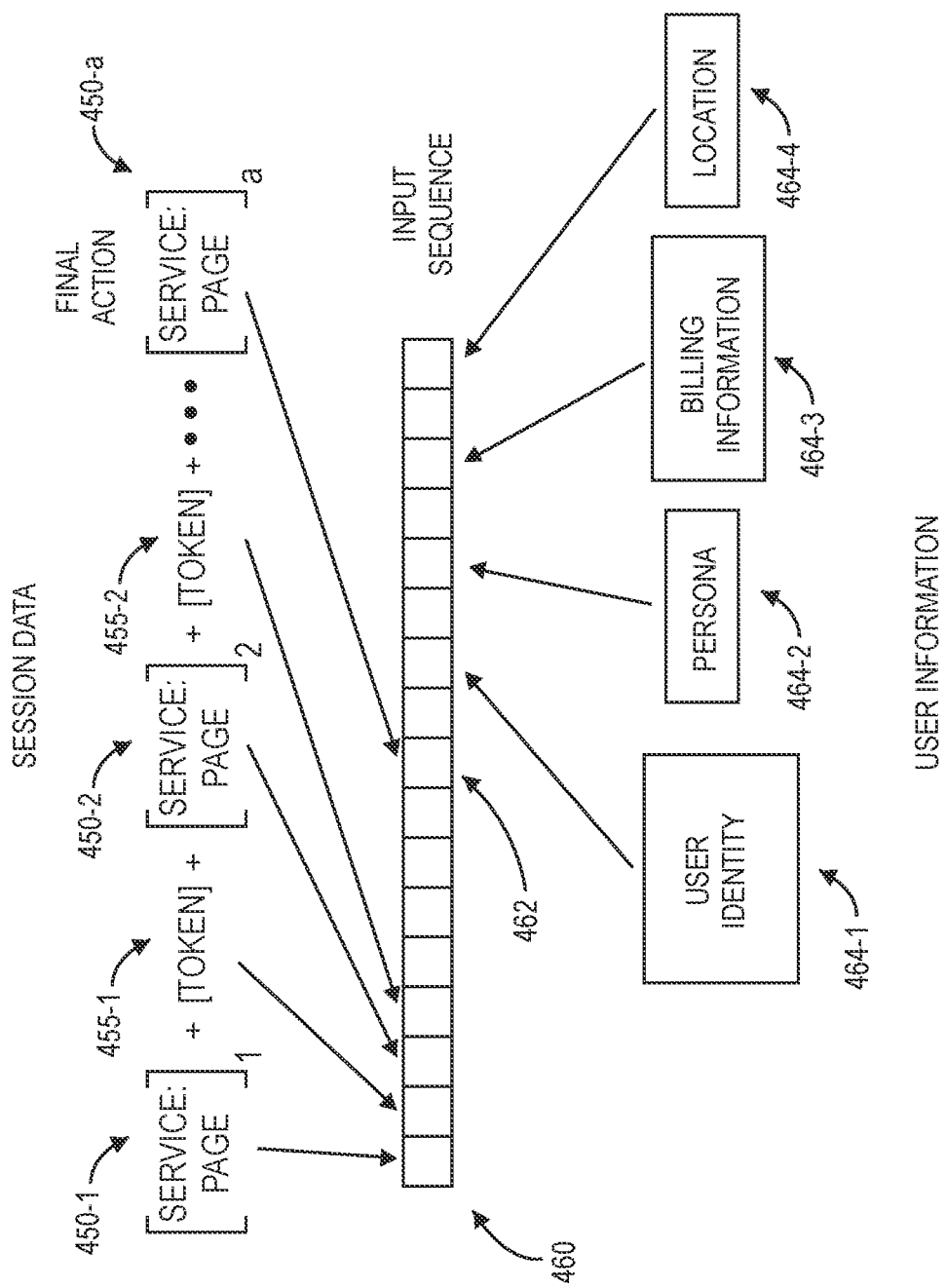
FIGS. 4A and 4B are views of aspects of one system in accordance with embodiments of the present disclosure.
Figure 4B:
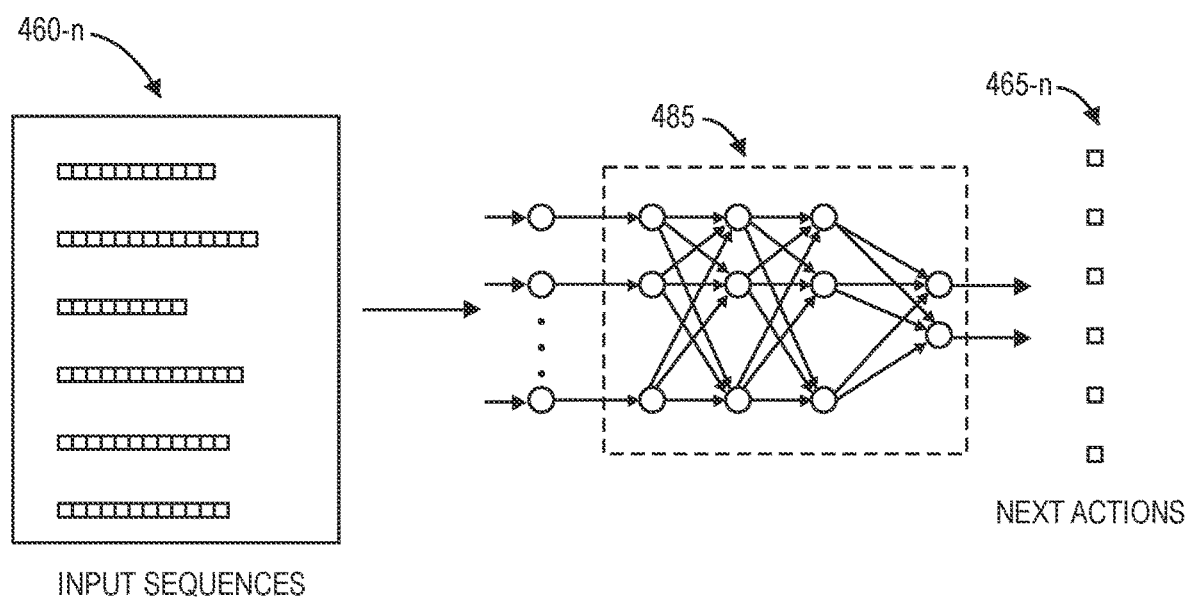

Referring to FIGS. 4A and 4B, views of one system in accordance with embodiments of the present disclosure are shown. Except where otherwise noted, reference numerals preceded by the number "4" shown in FIGS. 4A and 4B indicate components or features that are similar to components or features having reference numerals preceded by the number "2" shown in FIG. 2A or 2B or by the number "1" shown in FIGS. 1A through 1I.

As is shown in FIG. 4A, an input sequence 460 of session data 450-1, 450-2 . . . 450-a and a plurality of information 464-1, 464-2, 464-3, 464-4 regarding a user is shown. The session data 450-1, 450-2 . . . 450-a includes a series of clicks or other interactions (e.g., clickstream data) that is captured and stored during a session by a user, and may represent a record of a path or a sequence of the clicks or other interactions undertaken by the user during a session. For example, the sequence 460 may include text-based identifiers of actions taken by the user, e.g., the services used by the users and pages (or sub-pages) visited or operated by the user, in combinations such as [SERVICE:PAGE], and each of the combinations may be separated by a token 455-1, 455-2 or another set of text or an identifier. Additionally, the sequence 460 may further include text-based identifiers of an identity 464-1 of the user, a persona 464-2 to which the user has been assigned, billing information 464-3 for the user, and a location 464-4 of the user. Alternatively, the sequence 460 may include any number of other sets of text or representations of actions by the user, or information or data regarding the user.

Sequences of session data of users generated in a manner similar to that shown in FIG. 4A may be provided to a model that has learned representations of other users in order to identify or predict actions for such users. As is shown in FIG. 4B, a plurality of input sequences 460-n may be provided as inputs to a model 485, and outputs 465-n generated by the model 485 in response to such inputs may be used to predict next actions, e.g., next services or pages (or sub-pages) desired by such users during their respective sessions. In some implementations, the model 485 may include any number of transformers having one or more attention mechanisms, e.g., a BERT having any number of layers, each of which may be configured to learn different contextual information from the respective representations. Alternatively, the model 485 may be any principal component analysis; singular value decomposition; deep learning system; nearest neighbor method or analysis; factorization method or analysis; generative model; gradient boosted decision tree; support vector machine; similarity measure, or others, that may be trained to predict next actions for users during sessions based on representations of such users and information or data regarding contexts of their particular sessions.

Figure 5A:
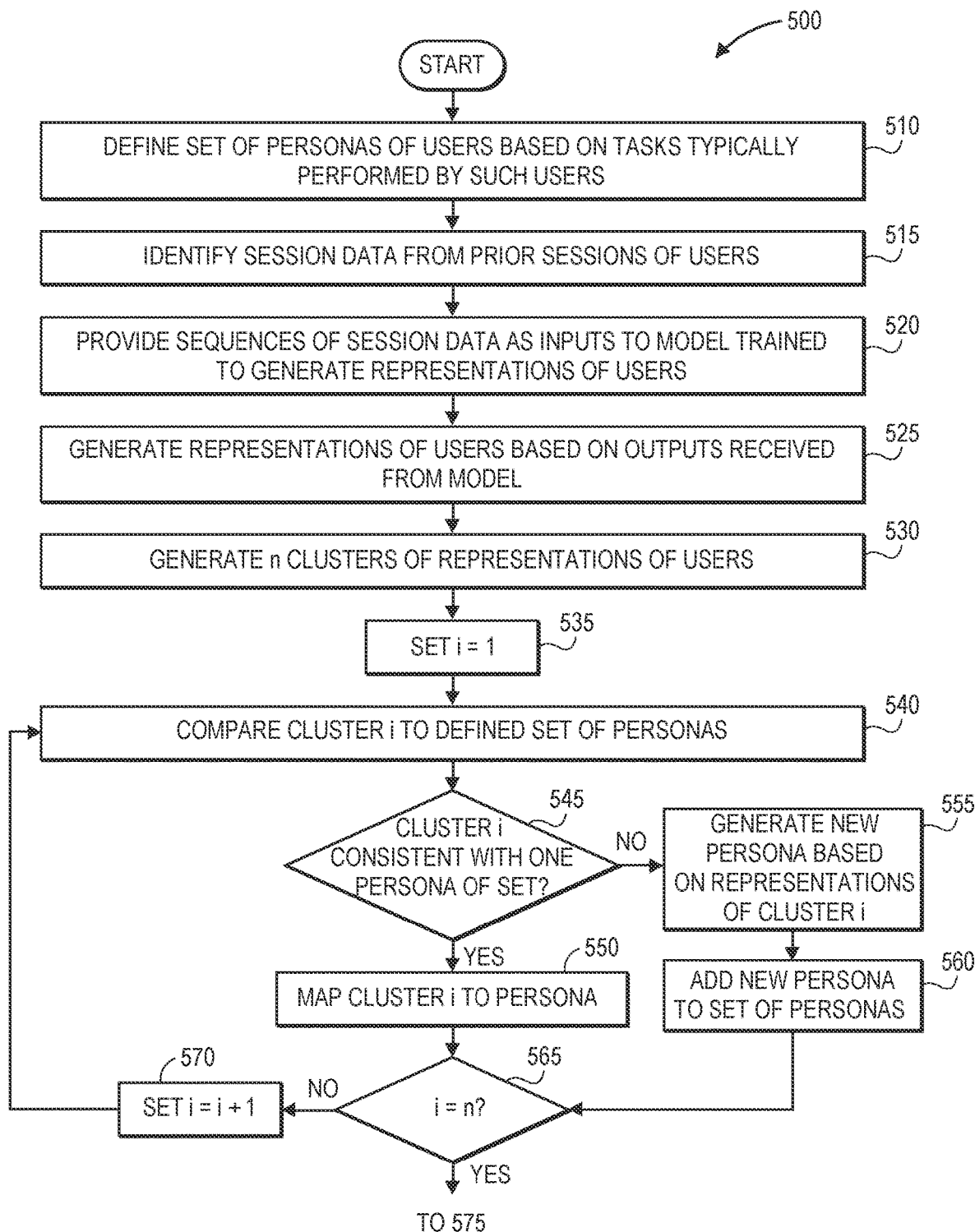
FIGS. 5A and 5B are a flow chart of one process in accordance with embodiments of the present disclosure.
Figure 5B:
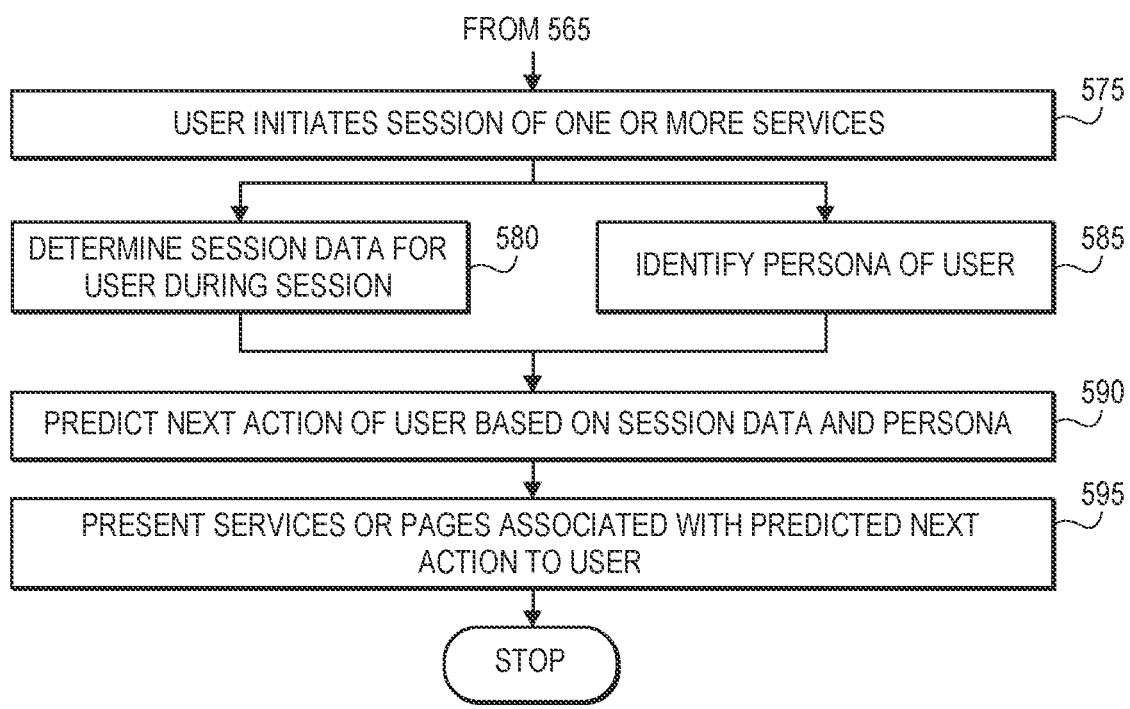

Referring to FIGS. 5A and 5B, a flow chart of one process 500 in accordance with embodiments of the present disclosure is shown. At box 510, a set of personas of users is defined based on tasks typically performed by such users. For example, a persona may represent aspects of the respective users' experiences with services that may be determined and attributed to a specific type or group of user, and may be defined based in part on surveys, questionnaires, other requests for information or data that have been generated and circulated to the users of the services. The personas may be defined by sets of tasks that are distinct to the personas, or which may be shared with one or more other personas, and may bear labels generally or specifically identifying the personas or tasks with which such personas are associated.

At box 515, session data, e.g., records or sets of transactions of users during any prior sessions, or trajectories, as well as billing information for such users, geographical information, services, pages or sub-pages navigated by the users, is identified from prior sessions of the users.

At box 520, sequences of the session data are provided as inputs to a model that is trained to generate representations of the users. The sequences may include text describing the session data, e.g., session locations, billing features, and sequences of activities identifying both services utilized by such users and pages or sub-pages (e.g., widgets, application programming interfaces, or other features) visited or operated by such users. The sequences of session data may be effectively constructed as sentences summarizing activities of each of such users.

At box 525, representations of the users are generated based on outputs received from the model. For example, where the model is trained to generate representations from sequences of session data, outputs received from the model may include one or more embeddings or other representations of the session data.

At box 530, n clusters of the representations of the users are generated. For example, the representations may be processed according to a clustering algorithm, e.g., a K-means clustering algorithm, a density-based clustering algorithm, a distribution-based clustering algorithm, a centroid-based clustering algorithm, a hierarchical-based clustering algorithm, or any other type or form of clustering algorithm, e.g., a BIRCH algorithm, a DBSCAN algorithm, or any similar algorithm. The n clusters may be defined to include all representations within a predetermined distance of one another, and the value of n may be selected or set on any basis.

At box 535, a value of a step variable i is set equal to one, or i=1. At box 540, a cluster i of the n clusters is compared to the defined set of personas, e.g., according to one or more probability measures. For example, in some implementations, personas may be mapped to clusters by generating one-hot encodings for each persona. The one-hot encodings generated for each persona may have lengths corresponding to a total number of tasks, and values of 1 for tasks that are included in a definition of the persona, and values of 0 for tasks that are not included in the persona.

At box 545, whether the cluster i is consistent with one persona of the set is determined. If the cluster i is consistent with one persona of the set, then the process advances to box 550, where the cluster i is mapped to that persona of the set.

If the cluster i is not consistent with any of the personas of the set, then the process advances to box 555, where a new persona is generated based on the representations of the cluster i. Where the cluster i may not be adequately mapped to one of a set of personas, another persona may be generated and the cluster of the representations of such users, and the users themselves, may be assigned to that persona. For example, where a cluster of representations is equidistant or sufficiently remote from two or more personas, a new persona may be formed, and one or more users may be assigned to the persona based on their respective representations.

At box 560, the new persona is added to the set of personas.

At box 565, whether a value of the step variable i is equal to the number n of clusters generated at box 530, is determined. If the value of the step variable i is not equal to the number n, then the process advances to box 570, where the value of the step variable i is incremented by one, or set equal to i+1, before the process returns to box 540, where the cluster i is compared to the defined set of personas.

If the value of the step variable i is equal to the number n, then the process advances to box 575, where the user initiates a session of one or more services. During the session, the user may operate or access any number of services or networked resources, or pages or sub-pages that are relevant to the goals or objectives of the user.

At box 580, session data is determined for the user during the session. The session data may include information or data that is similar to the session data identified from the prior sessions of the users at box 515, or other information or data.

In parallel, at box 585, a persona of the user is identified. The persona may be one of the set of personas defined at box 510, a new persona added to the set of personas, or any other persona.

At box 590, a next action of the user is predicted based on the session data and the persona identified at box 585. The next action may involve or include a service associated with the networked service provider, or a page of such a service, or both a service and a page, and may be identified based on the output received at box 360. A next action may be predicted based on the output. Alternatively, any other type or form of next action that might be taken by the user may be identified based on session data or a persona of a user.

At box 595, services or pages associated with the predicted next action are presented to the user, and the process ends.

Figure 6A:
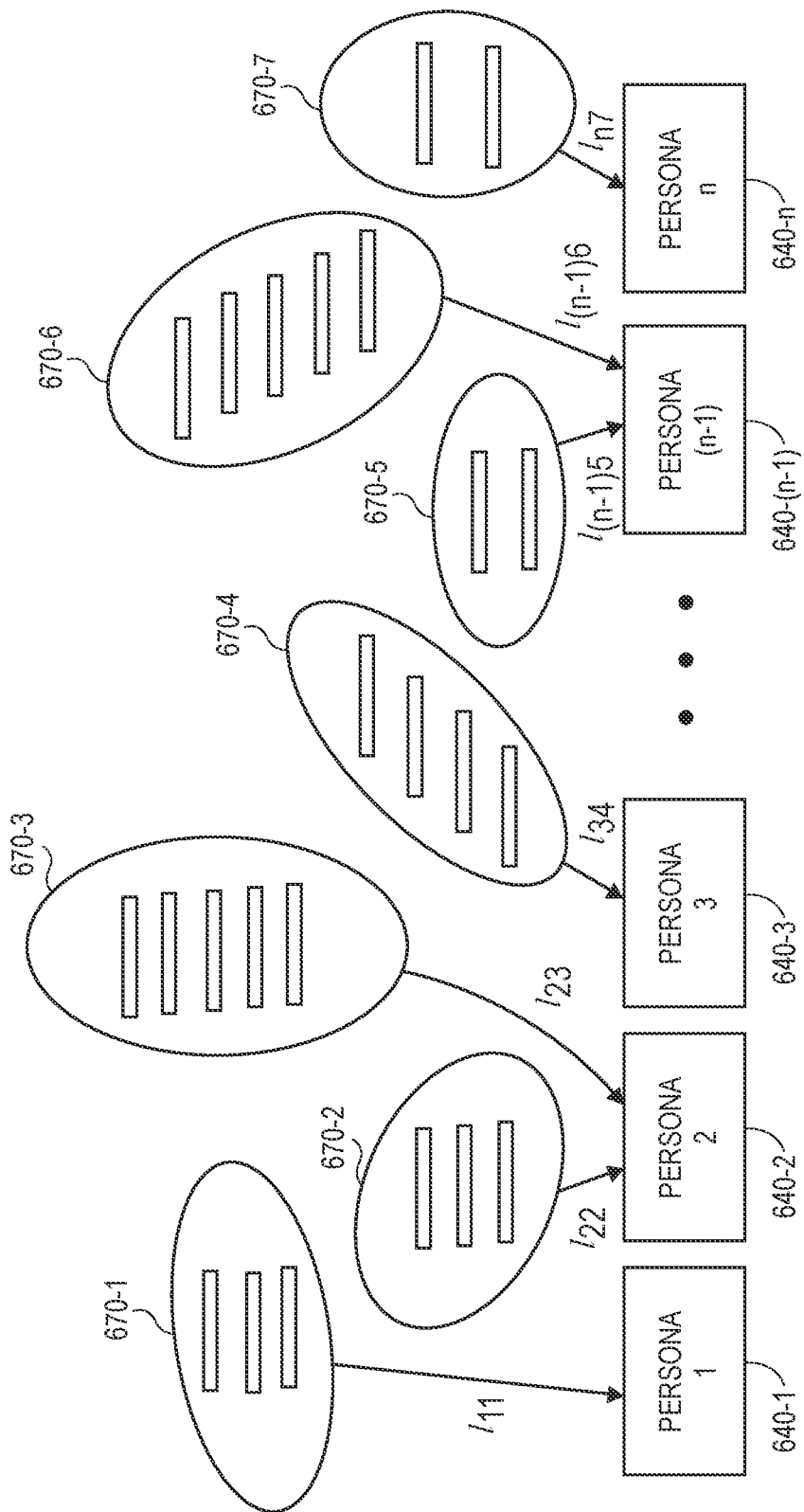

Referring to FIGS. 6A through 6C, views of aspects of one system in accordance with embodiments of the present disclosure are shown. Except where otherwise noted, reference numerals preceded by the number "6" shown in FIGS. 6A through 6C indicate components or features that are similar to components or features having reference numerals preceded by the number "4" shown in FIGS. 4A and 4B, by the number "2" shown in FIG. 2A or 2B or by the number "1" shown in FIGS. 1A through 1I.

As is shown in FIG. 6A, clusters 670-1, 670-2, 670-3, 670-4, 670-5, 670-6, 670-7 are mapped to personas 640-1, 640-2, 640-3 . . . 640-(n−1), 640-n in accordance with implementations of the present disclosure. For example, the representations of the clusters 670-1, 670-2, 670-3, 670-4, 670-5, 670-6, 670-7 may have been generated based on outputs received from a model, e.g., a BERT, a principal component analysis, a singular value decomposition, or other models, in response to inputs including sequences of session data as well as any other information regarding the users, e.g., billing information, location data, identifiers of personas, or others. The representations may have been clustered by one or more clustering algorithms, e.g., a K-means clustering algorithm, a density-based clustering algorithm, a distribution-based clustering algorithm, a centroid-based clustering algorithm, a hierarchical-based clustering algorithm, or any other type or form of clustering algorithm.

The clusters 670-1, 670-2, 670-3, 670-4, 670-5, 670-6, 670-7 may be compared to one or more of the personas 640-1, 640-2, 640-3 . . . 640-(n−1), 640-n in any manner. For example, in some implementations, the personas 640-1, 640-2, 640-3 . . . 640-(n−1), 640-n may be mapped to the clusters 670-1, 670-2, 670-3, 670-4, 670-5, 670-6, 670-7 by generating one-hot encodings for each of the personas 640-1, 640-2, 640-3 . . . 640-(n−1), 640-n. Probability distributions of clusters being assigned to specific personas may be calculated, and a persona having a maximum probability distribution with a cluster, e.g., a persona nearest to that cluster, will be the persona assigned to that cluster. As is shown in FIG. 6A, distances (e.g., statistical distances, or Euclidean distances) between the clusters 670-1, 670-2, 670-3, 670-4, 670-5, 670-6, 670-7 and the personas 640-1, 640-2, 640-3 . . . 640-(n−1), 640-n may be determined, and a cluster may be assigned to a persona based on a minimum distance between that cluster and one of the personas. For example, where a distance $l_{11}$ between the cluster 670-1 and the persona 640-1 is a shortest of the distances between the cluster 670-1 and each of the personas 640-1, 640-2, 640-3 . . . 640-(n−1), 640-n, the cluster 670-1 may be assigned to the persona 640-1, and each of the users from which representations of the cluster 670-1 were generated may be determined to be members of the persona 640-1.

Similarly, where distances $l_{22}$, $l_{23}$ between the clusters 670-2, 670-3 and the persona 640-2 are the shortest of the distances between the cluster 670-2 or the cluster 670-3 and each of the personas 640-1, 640-2, 640-3 . . . 640-(n−1), 640-n, the clusters 670-2, 670-3 may be assigned to the persona 640-2, and each of the users from which representations of the clusters 670-2, 670-3 were generated may be determined to be members of the persona 640-2. Where a distance $l_{34}$ between the cluster 670-4 and the persona 640-3 is a shortest of the distances between the cluster 670-4 and each of the personas 640-1, 640-2, 640-3 . . . 640-(n−1), 640-n, the cluster 670-4 may be assigned to the persona 640-3, and each of the users from which representations of the cluster 670-4 were generated may be determined to be members of the persona 640-3.

Where distances $l_{(n-1)5}$, $l_{(n-1)6}$ between the clusters 670-5, 670-6 and the persona 640-(n−1) are the shortest of the distances between the cluster 670-5 or the cluster 670-6 and each of the personas 640-1, 640-2, 640-3 . . . 640-(n−1), 640-n, the clusters 670-5, 670-6 may be assigned to the persona 640-($n-1$), and each of the users from which representations of the clusters 670-5, 670-6 were generated may be determined to be members of the persona 640-($n-1$). Where a distance $l_{n7}$ between the cluster 670-7 and the persona 640-$n$ is a shortest of the distances between the cluster 670-7 and each of the personas 640-1, 640-2, 640-3 . . . 640-($n-1$), 640-$n$, the cluster 670-7 may be assigned to the persona 640-$n$, and each of the users from which representations of the cluster 670-7 were generated may be determined to be members of the persona 640-$n$.

As is shown in FIG. 6B, a cluster 670-8 may be determined to be equidistant from two or more nearest personas, e.g., a persona 640-$a$ and a persona 640-$b$, where a distance $l_{a8}$ between the cluster 670-8 and the persona 640-$a$ is approximately the same as a distance $l_{b8}$ between the cluster 670-8 and the persona 640-$b$. Alternatively, the cluster 670-8 may be determined to be insufficiently close to either the persona 640-$a$ or the persona 640-$b$, for the cluster 670-8 to be assigned to either of such personas 640-$a$, 640-$b$, such as where the distance las or the distance $l_{b8}$ is not sufficiently small, or is greater than a predetermined threshold.

As is shown in FIG. 6C, where the cluster 670-8 is not sufficiently close to either the persona 640-$a$ or the persona 640-$b$, or may not otherwise be assigned to either of such personas 640-$a$, 640-$b$, a new persona 640-$c$ may be defined to include any number of tasks. For example, the persona 640-$c$ may be defined to include one or more tasks of the persona 640-$a$, one or more tasks of the persona 640-$b$, or any other tasks ordinarily performed by the users from which the representations of the cluster 670-8 were generated. As is further shown in FIG. 6C, a distance 1$c$8 between the cluster 670-8 and the persona 640-$c$ is substantially smaller than either the distance las or distance $l_{b8}$.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 5A and 5B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system comprising:
   one or more computer processors;
   one or more memory components; and
   one or more data stores,
   wherein the first computer system is programmed with one or more sets of instructions that, when executed, cause the first computer system to perform a method comprising:
      determining data regarding a plurality of user sessions, wherein the data identifies, for each of the plurality of user sessions, at least one of a plurality of networked services accessed by a user during one of the plurality of user sessions and a page visited by the user during the one of the plurality of user sessions;
      generating sequences for each of the plurality of user sessions, wherein each of the sequences comprises:
         a text-based identifier of a networked service and a page of the networked service;
         a text-based identifier of another networked service and a page of the other networked service; and a text-based token provided between the text-based identifiers;
providing each of the sequences to a model as inputs;
receiving outputs from the model, wherein each of the outputs comprises a representation of a user;
defining a set of clusters of a plurality of representations of the users, wherein each of the set of clusters comprises at least one representation of a user;
mapping each of the set of clusters to one of a set of personas, wherein each of the personas is defined to include at least one task unique to a persona and at least one task shared with another persona;
determining that a first user is associated with a first cluster of the set of clusters; and
selecting at least one of a networked service or a page for the first user based at least in part on a first persona to which the first cluster is mapped.

2. The first computer system of claim 1, wherein mapping each of the set of clusters to one of the set of personas comprises:
determining probabilities that tasks of each of the set of personas of the set are included in one of the representations of the clusters; and
for each of the clusters,
identifying a persona having a greatest probability that a task of the persona is included in the cluster; and
mapping the cluster to the persona.

3. The first computer system of claim 1, wherein mapping each of the plurality of clusters to one of the set of personas comprises:
determining probabilities that tasks of each of the set of personas of the set are included in one of the representations of the clusters; and
determining that a first probability that a task of a second persona of the set of personas is included in a first cluster is approximately equal to a second probability that a task of a third persona of the set of personas is included in the first cluster, wherein the first cluster is one of the plurality of clusters; and
in response to determining that the first probability is approximately equal to the second probability,
defining a fourth persona based at least in part on at least one of the tasks of the second persona and at least one of the tasks of the third persona;
adding the fourth persona to the set of personas; and
mapping the first cluster to the fourth persona.

4. The first computer system of claim 1, wherein the model comprises one of:
a bidirectional encoder representations from transformers having a plurality of layers;
a principal component analysis; or
a singular value decomposition.

5. The first computer system of claim 1, wherein each of the representations is an embedding comprising a continuous vector representing at least some of a sequence of activity of a user.

6. A method comprising:
providing data representing sequences of activities of a plurality of users of a networked service provider as a first set of inputs to a model, wherein each of the sequences of activities comprises a text-based identifier of at least one of a plurality of services provided by the networked service provider to one of the users or a page operated by the one of the users in accordance with one of the plurality of services, and wherein the model is trained to generate a representation of a user based at least in part on a sequence of activity of the user;
receiving a first set of outputs from the model in response to the first set of inputs;
determining representations of the plurality of users based at least in part on the first set of outputs;
generating a plurality of clusters of the representations;
identifying a plurality of tasks performed by the users of at least one of the plurality of services provided by the networked service provider;
defining a set of personas based at least in part on the plurality of tasks, wherein each of the plurality of personas is defined to include at least one task unique to a persona and at least one task shared with another persona;
mapping each of the plurality of clusters to one of the set of personas;
identifying a first sequence of activity of a first user of the networked service provider;
determining that the first user is associated with a first persona of the set of personas based at least in part on the first sequence of activity; and
in response to determining that the first user is associated with the first persona,
selecting at least one of a service provided by the networked service provider or a page associated with the service for the first user based at least in part on a task of the first persona.

7. The method of claim 6, wherein the model comprises one of:
a bidirectional encoder representations from transformers having a plurality of layers;
a principal component analysis; or
a singular value decomposition.

8. The method of claim 6, wherein the first sequence of activity comprises:
a first activity of the first user during a first user session;
a first page accessed by the first user during the first user session;
a second activity of the first user during the first user session; and
a second page accessed by the first user during the first user session.

9. The method of claim 8, wherein determining that the first user is associated with the first persona of the set of personas based at least in part on the first sequence of activity comprises:
providing information regarding the first sequence of activity as a second set of inputs to the model, wherein the information regarding the first sequence of activity comprises:
a first text-based identifier of the first activity;
a second text-based identifier of the second activity; and
a text-based token provided between the first text-based identifier and the second text-based identifier;
receiving a second set of outputs from the model in response to the second set of inputs; and
determining a representation of the first user based at least in part on the second set of outputs,
wherein that the first user is associated with the first persona of the set of personas is determined based at least in part on the representation of the first user.

10. The method of claim 6, wherein each of the representations is an embedding comprising a continuous vector representing at least some of a sequence of activity of a user.

11. The method of claim 6, wherein mapping each of the plurality of clusters to one of the set of personas comprises:

determining probabilities that tasks of each of the set of personas of the set are included in one of the representations of the clusters; and for each of the clusters,
identifying a persona having a greatest probability that a task of the persona is included in the cluster; and
mapping the cluster to the persona.

12. The method of claim 6, wherein mapping each of the plurality of clusters to one of the set of personas comprises:
determining probabilities that tasks of each of the set of personas of the set are included in one of the representations of the clusters; and
determining that a first probability that a task of a second persona of the set of personas is included in a first cluster is approximately equal to a second probability that a task of a third persona of the set of personas is included in the first cluster, wherein the first cluster is one of the plurality of clusters; and
in response to determining that the first probability is approximately equal to the second probability,
defining a fourth persona based at least in part on at least one of the tasks of the second persona and at least one of the tasks of the third persona;
adding the fourth persona to the set of personas; and
mapping the first cluster to the fourth persona.

13. The method of claim 6, wherein identifying the plurality of tasks comprises:
receiving survey data from computer devices of at least some of the users, wherein the plurality of tasks are identified based at least in part on the survey data.

14. The method of claim 6, wherein each of the plurality of services is one of a web-based application, a cloud computing function, a monitoring application, a database management application or an integrated development environment.

15. The method of claim 6, wherein the first sequence of activity comprises:
a first set of text identifying a first service provided by the networked service provider and a first page operated by the first user in accordance with the first service;
a token following the first set of text; and
a second set of text identifying a second service provided by the networked service provider and a second page operated by the first user in accordance with the second service.

16. A method comprising:
providing data representing sequences of activities of a plurality of users of a networked service provider as a first set of inputs to a model, wherein each of the sequences of activities comprises a text-based identifier of at least one of a plurality of services provided by the networked service provider to one of the users or a page operated by the one of the users in accordance with one of the plurality of services, and wherein the model is trained to generate a representation of a user based at least in part on a sequence of activity of the user;
receiving a first set of outputs from the model in response to the first set of inputs;
determining representations of the plurality of users based at least in part on the first set of outputs;
generating a plurality of clusters of the representations;
identifying a plurality of tasks performed by the users of at least one of the plurality of services provided by the networked service provider;
defining a set of personas based at least in part on the plurality of tasks, wherein each of the plurality of personas is defined to include at least one task unique to a persona and at least one task shared with another persona;
determining probabilities that tasks of each of the set of personas of the set are included in one of the representations of the clusters; and
determining that a first probability that a task of a first persona of the set of personas is included in a first cluster is approximately equal to a second probability that a task of a second persona of the set of personas is included in the first cluster, wherein the first cluster is one of the plurality of clusters; and
in response to determining that the first probability is approximately equal to the second probability,
defining a third persona based at least in part on at least one of the tasks of the first persona and at least one of the tasks of the second persona;
adding the third persona to the set of personas; and
mapping the first cluster to the third persona.

17. The method of claim 16, further comprising:
mapping each of the plurality of clusters to one of the set of personas;
identifying a first sequence of activity of a first user of the networked service provider;
determining that the first user is associated with one of the first persona or the third persona based at least in part on the first sequence of activity; and
in response to determining that the first user is associated with the first persona,
selecting at least one of a service provided by the networked service provider or a page associated with the service for the first user based at least in part on a task of the first persona.

18. The method of claim 16, wherein the model comprises one of:
a bidirectional encoder representations from transformers having a plurality of layers;
a principal component analysis; or
a singular value decomposition.

19. The method of claim 16, wherein the first sequence of activity comprises:
a first activity of the first user during a first user session;
a first page accessed by the first user during the first user session;
a second activity of the first user during the first user session; and
a second page accessed by the first user during the first user session.

20. The method of claim 16, wherein each of the plurality of services is one of a web-based application, a cloud computing function, a monitoring application, a database management application or an integrated development environment.

* * * * *